US011891071B2

(12) United States Patent
Ferguson

(10) Patent No.: US 11,891,071 B2
(45) Date of Patent: *Feb. 6, 2024

(54) VEHICLE TO VEHICLE TELEMATICS

(71) Applicant: Allstate Insurance Company, Northbrook, IL (US)

(72) Inventor: Dana Ferguson, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,567

(22) Filed: Jan. 3, 2022

(65) Prior Publication Data
US 2022/0194391 A1 Jun. 23, 2022

Related U.S. Application Data

(63) Continuation of application No. 16/567,334, filed on Sep. 11, 2019, now Pat. No. 11,242,064, which is a
(Continued)

(51) Int. Cl.
*B60W 60/00* (2020.01)
*G08G 1/09* (2006.01)
(Continued)

(52) U.S. Cl.
CPC .............. *B60W 40/09* (2013.01); *G07C 5/008* (2013.01); *H04L 67/12* (2013.01)

(58) Field of Classification Search
CPC ... B60W 40/09; B60W 2556/65; G07C 5/008; H04L 67/12; H04L 67/306; G08G 1/0112; G08G 1/0129
See application file for complete search history.

(56) References Cited

U.S. PATENT DOCUMENTS 6,711,474 B1 3/2004 Treyz et al.
8,255,275 B2 8/2012 Cojllopy et al.
(Continued)

FOREIGN PATENT DOCUMENTS

WO 2010095119 A1 8/2010
WO 2013134863 A1 9/2013

OTHER PUBLICATIONS

Auto Insurance Coverage & Car Insurance Quotes Allstate, "When You're In The Car, We've Got You Covered", Retrieved on Oct. 13, 2014, http://www.allstate.com/auto-insurance/auto-insurance-coverage-otpions.aspx.
(Continued)

*Primary Examiner* — Rodney A Butler
(74) *Attorney, Agent, or Firm* — Dinsmore & Shohl LLP

(57) ABSTRACT

Systems and methods of analyzing a target vehicle based on other vehicles are disclosed. One or more computing devices may receive monitoring vehicle driving data collected from vehicle operation sensors within at least one monitoring vehicle by a telematics device. The one or more computing devices may further receive target vehicle driving data from the telematics device of the at least one monitoring vehicle. The one or more computing devices may determine a driving behavior associated with the target vehicle based on an analysis of the monitoring vehicle driving data and the target vehicle driving data. The one or more computing devices may calculate one or more driver scores based on the driving behavior.

20 Claims, 11 Drawing Sheets

Related U.S. Application Data continuation of application No. 15/057,386, filed on Mar. 1, 2016, now Pat. No. 10,449,967.

(51) Int. Cl.
  B60W 40/09 (2012.01)
  G07C 5/00 (2006.01)
  H04L 67/12 (2022.01)

(56) References Cited

U.S. PATENT DOCUMENTS

| | | | |
|---|---|---|---|
| 8,466,781 | B2 | 6/2013 | Miller et al. |
| 8,549,318 | B2 | 10/2013 | White et al. |
| 8,577,703 | B2 | 11/2013 | McClellan et al. |
| 8,606,492 | B1 | 12/2013 | Botnen |
| 8,686,844 | B1 | 4/2014 | Wise |
| 8,731,974 | B2 | 5/2014 | Pandhi et al. |
| 9,147,353 | B1 | 9/2015 | Slusar |
| 9,623,876 | B1 | 4/2017 | Slusar |
| 9,925,987 | B1 | 3/2018 | Nguyen |
| 2005/0206236 | A1 | 9/2005 | Mori et al. |
| 2008/0243558 | A1 | 10/2008 | Gupte |
| 2008/0255722 | A1 | 10/2008 | McClellan et al. |
| 2009/0284361 | A1 | 11/2009 | Boddie et al. |
| 2010/0253539 | A1 | 10/2010 | Seder et al. |
| 2011/0040579 | A1 | 2/2011 | Havens |
| 2011/0106370 | A1 | 5/2011 | Duddle et al. |
| 2011/0307188 | A1* | 12/2011 | Peng ........... G01C 21/3697 702/33 |
| 2012/0041675 | A1 | 2/2012 | Juliver et al. |
| 2012/0089423 | A1 | 4/2012 | Tamir et al. |
| 2012/0093357 | A1 | 4/2012 | Seder et al. |
| 2012/0109418 | A1 | 5/2012 | Lorber |
| 2012/0185282 | A1 | 7/2012 | Gore et al. |
| 2013/0144461 | A1 | 6/2013 | Ricci |
| 2013/0197973 | A1 | 8/2013 | Liu et al. |
| 2013/0238439 | A1 | 9/2013 | Chatterjee et al. |
| 2013/0316311 | A1 | 11/2013 | England |
| 2013/0332004 | A1 | 12/2013 | Gompert et al. |
| 2014/0032297 | A1 | 1/2014 | Germann et al. |
| 2014/0195272 | A1 | 7/2014 | Sadiq et al. |
| 2014/0195310 | A1* | 7/2014 | Mcquade ......... G06Q 10/06393 705/7.39 |
| 2014/0272810 | A1 | 9/2014 | Fields et al. |
| 2015/0161894 | A1 | 6/2015 | Duncan et al. |
| 2016/0171521 | A1 | 6/2016 | Ramirez et al. |
| 2016/0358477 | A1 | 12/2016 | Ansari |
| 2017/0031361 | A1 | 2/2017 | Olson et al. |
| 2017/0032402 | A1 | 2/2017 | Patsiokas et al. |
| 2019/0147262 | A1 | 5/2019 | Kuehnle et al. |

OTHER PUBLICATIONS

Auto Insurance Texas—Texas Teen Driving Resources, Retrived on Oct. 13, 2014, http://www.texasinsuranceprovider.com/Auto_Insurance_Texas_Teen_Driver.html.

Better drives pay less for car insurance with Snapshot Usage-Based Insurance program from Progressive, retrieved on Oct. 13, 2014, http://www.progressive/com/newsroom/article/2013/decemer/tennessee-snapshot-discount.

Carrot Car Insurance, How it Works, retrieved Oct. 13, 2014, http://www.carrotinsurance.com/HowItWorks.aspx.

Drivescribe "Smart driving is now rewarding" Peace of mind included, Aug. 2012, retrieved from http://drivescribe.com/wp-content/uploads/2012/08/DriveScripePRessKit_for-web.pdf.

Strategies to sustain good driving behaviror in the long-run; Part 3, fleetanswers.com, retrieved on Oct. 13, 2014, http://fleetanswers.com/content/strategies-sustain-good-driving-behavir-long-run-part-3.

Jul. 24, 2017—U.S. Non-Final Office Action—U.S. Appl. No. 15/057,386.

Zeng, X., Yin, K., and Ge, H., "Hazardous Driving Prediction System", Submission to the Connected Vehicle Technology Challenge, Sep. 24, 2014, 20 pages.

Feb. 14, 2018—U.S. Final Office Action—U.S. Appl. No. 15/057,386.

Jun. 28, 2018—U.S. Non-Final Office Action—U.S. Appl. No. 15/057,368.

Jan. 23, 2019—U.S. Final Office Action—U.S. Appl. No. 15/057,386.

Jun. 12, 2019—U.S. Notice of Allowance and Fees Due—U.S. Appl. No. 15/057,386.

\* cited by examiner

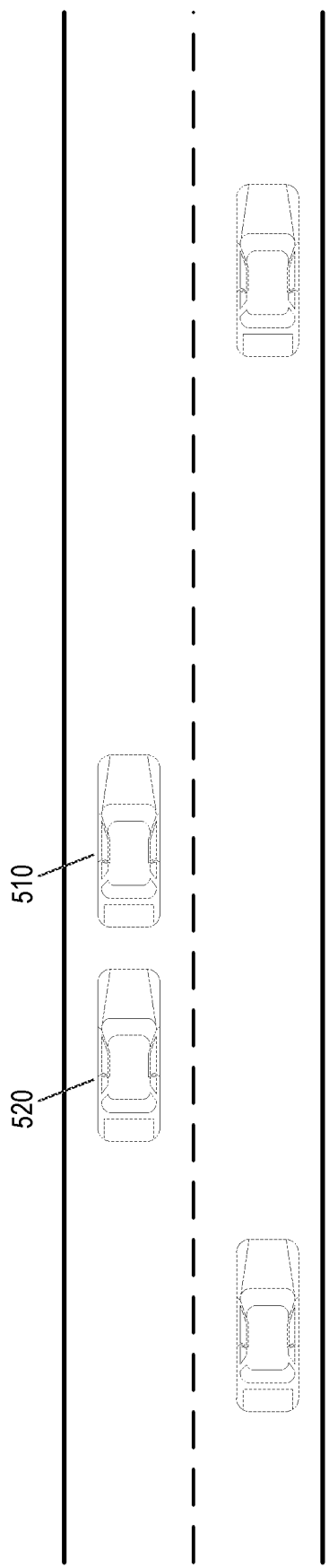
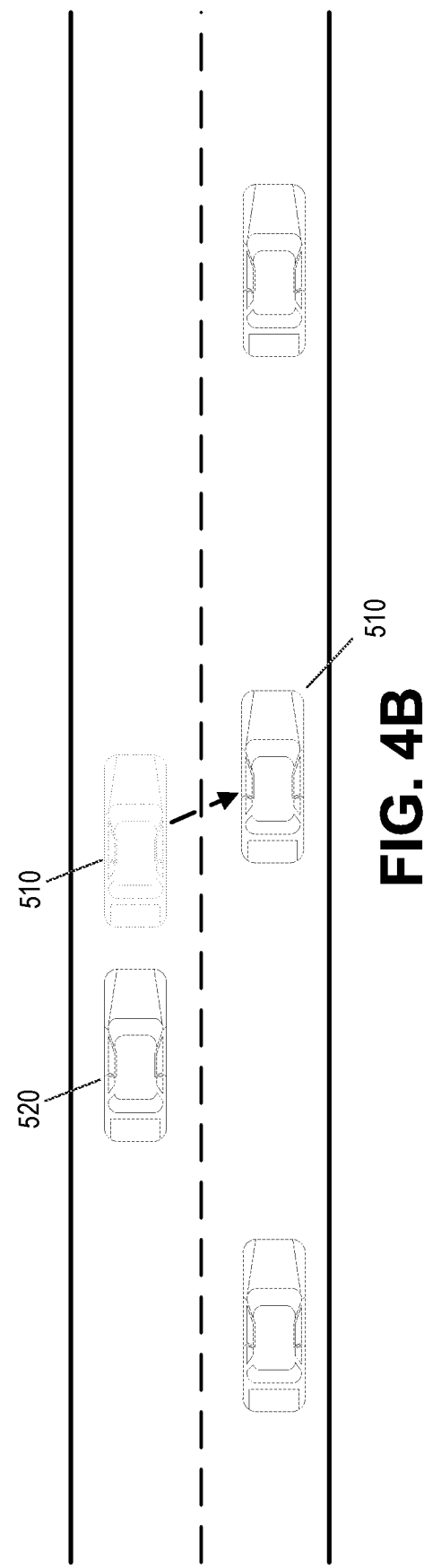

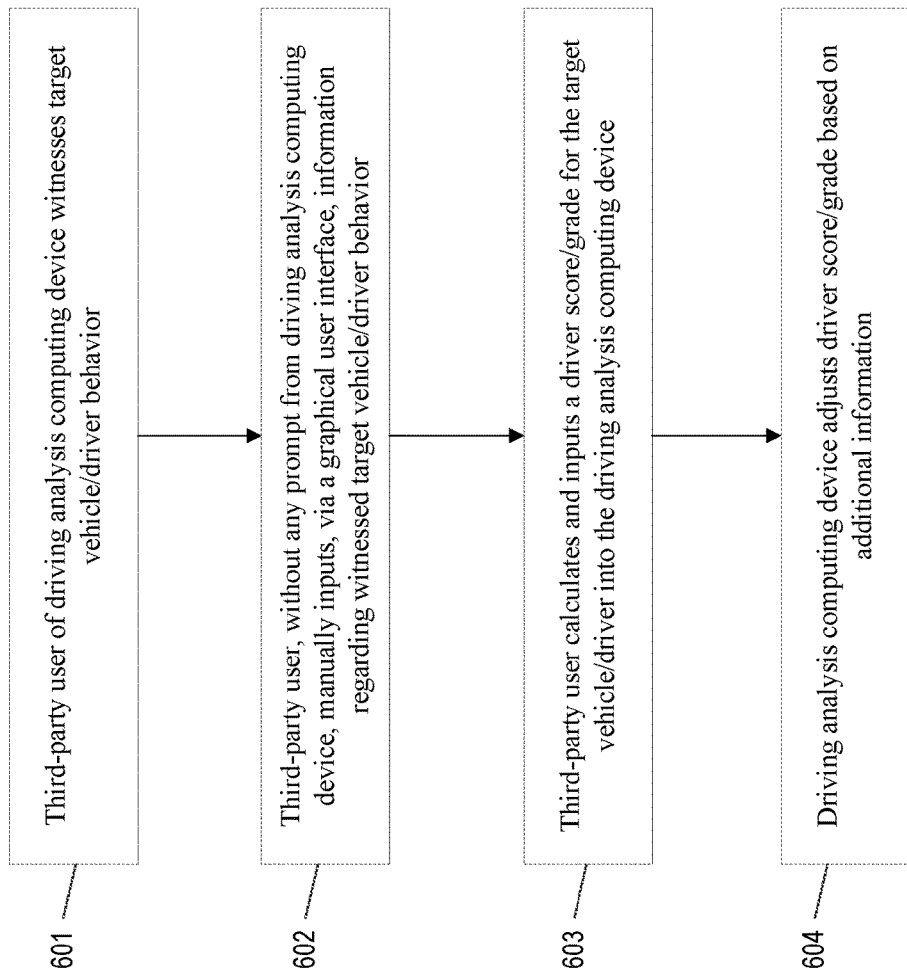

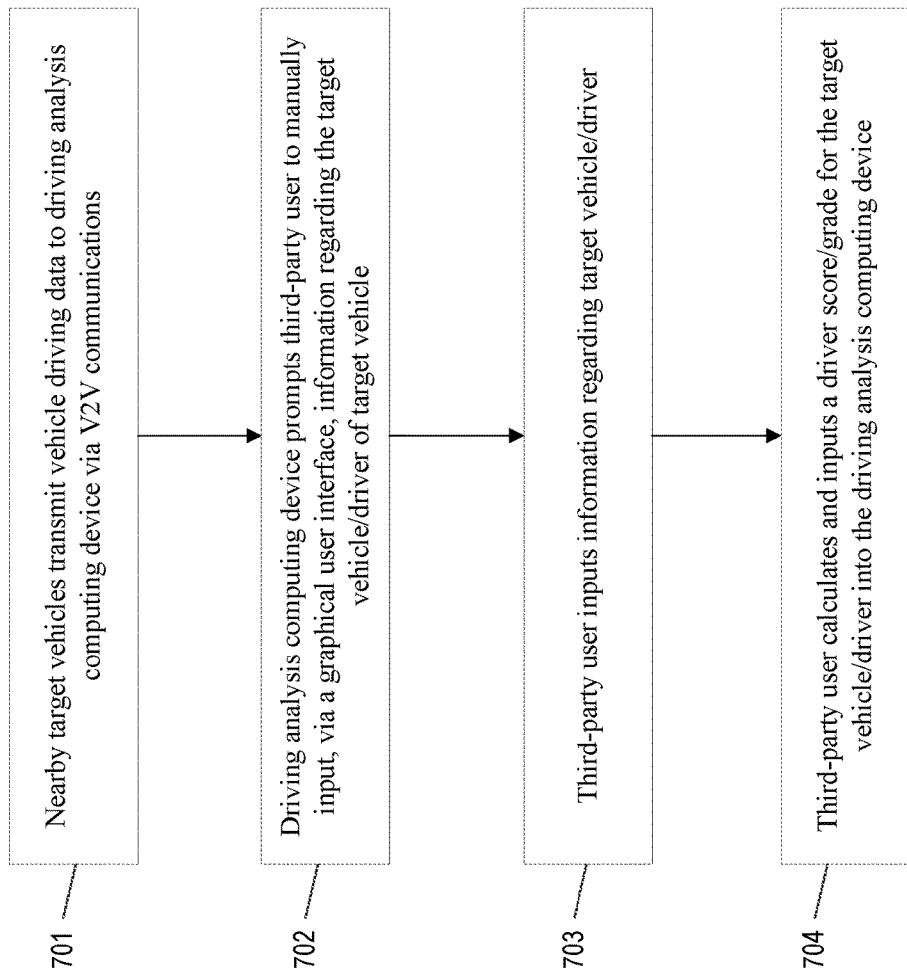

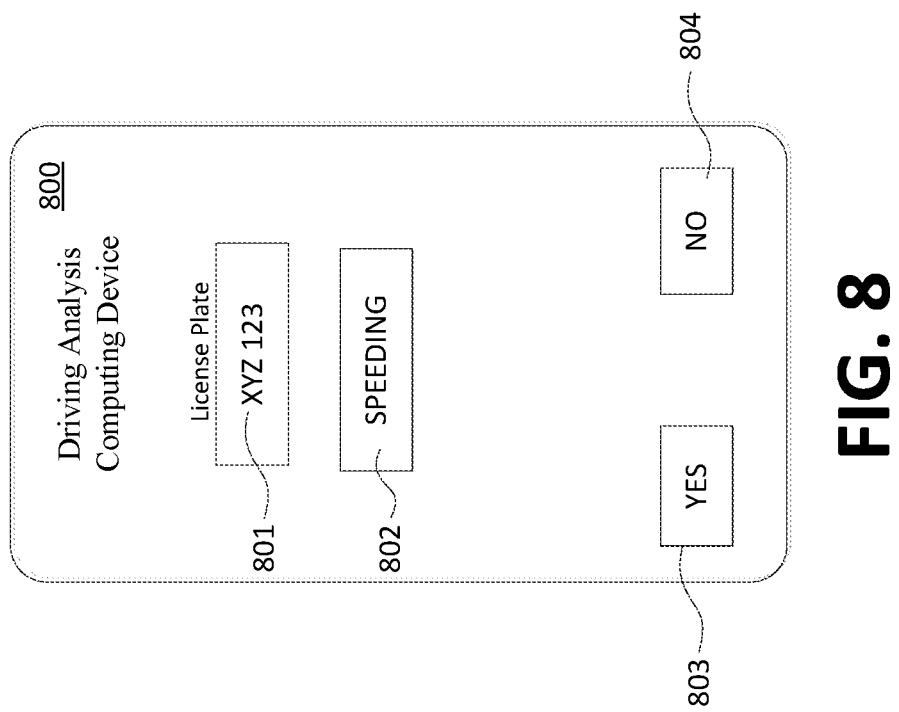

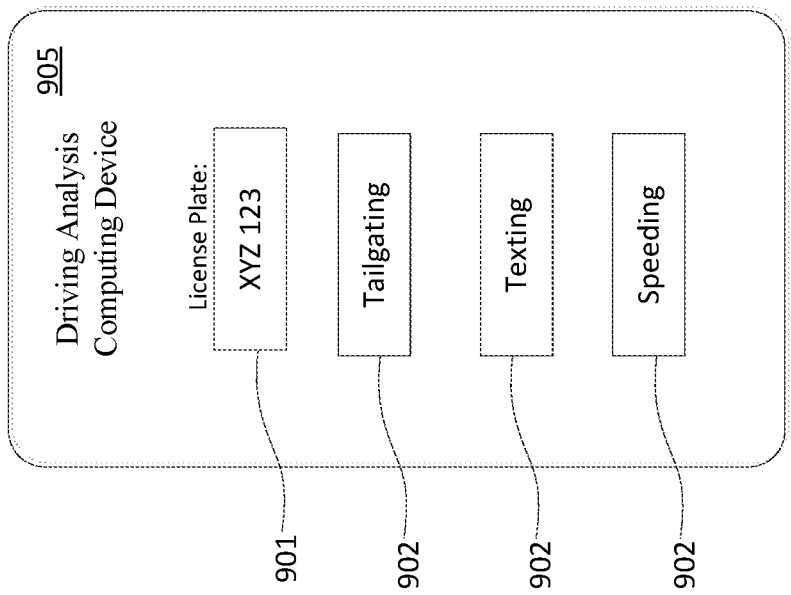

VEHICLE TO VEHICLE TELEMATICS

CROSS-REFERENCE TO RELATED-APPLICATIONS

This application is a continuation of U.S. application Ser. No. 15/057,386, filed Mar. 1, 2016. This application is incorporated by reference in its entirety.

BACKGROUND

Various vehicle-based communication systems allow vehicles to communicate with other devices inside or outside of the vehicle. For example, a Bluetooth system may enable communication between the vehicle and the driver's mobile phone. Telematics systems (e.g., on-board diagnostics (OBD) systems installed within vehicles) may be configured to access vehicle computers and sensor data and transmit the data to a display within the vehicle, a personal computer or mobile device, or to a centralized data processing system. Data obtained from OBD systems has been used for a variety of purposes, including maintenance, diagnosis, and analysis. Additionally, vehicle-to-vehicle (V2V) communication systems can be used to provide drivers with safety warnings and collision alerts based on data received from other nearby vehicles and/or to evaluate other drivers on the road.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure may include a driving analysis computing device comprising a processor and at least one memory storing computer-executable instructions, which when executed by the processor, cause the driving analysis computing device to receive monitoring vehicle driving data collected from vehicle operation sensors within at least one monitoring vehicle by a telematics device within the at least one monitoring vehicle, receive, from the telematics device of the at least one monitoring vehicle, target vehicle driving data, perform an analysis of the monitoring vehicle driving data and the target vehicle driving data, determine a driving behavior associated with the target vehicle based on the analysis of the monitoring vehicle driving data and the target vehicle driving data received from the telematics device of the at least one monitoring vehicle, and output the determined driving behavior associated with the at least one target vehicle.

In one aspect, the driving analysis computing device may calculate a driver grade for the target vehicle or a driver of the target vehicle based on the determined driving behavior. The target vehicle driving data may be transmitted from the target vehicle to the at least one monitoring vehicle using vehicle-to-vehicle communications. The target vehicle driving data transmitted from the target vehicle to the at least one monitoring vehicle may include at least one selected from the group consisting of a speed of the target vehicle, a position of the target vehicle, and a direction of travel of the target vehicle. The target vehicle driving data may include a driver score associated with the target vehicle or a driver of the target vehicle. Determining the driving behavior may include determining a first relative position of the target vehicle with respect to the at least one monitoring vehicle at a first time and determining a relative position of the target vehicle with respect to the at least one monitoring vehicle at a second time after the first time. Determining the driving behavior may further include determining that the target vehicle tailgated the at least one monitoring vehicle, based on the first and second relative positions and the first and second times. Alternatively, determining the driving behavior may further include determining that the target vehicle cut off the at least one monitoring vehicle, based on the first and second relative positions and the first and second times.

Aspects of the disclosure may include a computer-implemented method comprising receiving, by a driving analysis computing device, monitoring vehicle driving data corresponding to monitoring vehicle operation data of at least one monitoring vehicle, receiving, via vehicle-to-vehicle communication, target vehicle driving data corresponding to target vehicle operation data of at least one target vehicle, performing, by the driving analysis computing device, an analysis of the monitoring vehicle driving data and the target vehicle driving data, determining, by the driving analysis computing device, a driving behavior associated with the at least one target vehicle based on the analysis of the monitoring vehicle driving data and the target vehicle driving data, and outputting, by the driving analysis computing device, the determined driving behavior associated with the at least one target vehicle.

In one aspect, the computer-implemented method may further comprise calculating a driver grade for the at least one target vehicle or a driver of the at least one target vehicle based on the determined driving behavior. The computer-implemented method may further comprise retrieving, by the driving analysis computing device, historical driving behavior associated with the at least one target vehicle, wherein the driver grade for the at least one target vehicle is further calculated based on the historical driving behavior associated with the at least one target vehicle. The target vehicle driving data received via vehicle-to-vehicle communication may include at least one selected from the group consisting of a speed of the at least one target vehicle, a position of the at least one target vehicle, and a direction of travel of the at least one target vehicle. The target vehicle driving data received via vehicle-to-vehicle communication may include a driver score associated with the at least one target vehicle or a driver of the at least one target vehicle. Determining the driving behavior may include determining a first relative position of the target vehicle with respect to the at least one monitoring vehicle at a first time and determining a relative position of the target vehicle with respect to the at least one monitoring vehicle at a second time after the first time. Determining the driving behavior may further include determining that the target vehicle tailgated the at least one monitoring vehicle, based on the first and second relative positions and the first and second times. Alternatively, determining the driving behavior may further include determining that the target vehicle cut off the at least one monitoring vehicle, based on the first and second relative positions and the first and second times.

Aspects of the disclosure may include a driving analysis computing device comprising a processor and at least one memory storing computer-executable instructions, which when executed by the processor, cause the driving analysis computing device to receive monitoring vehicle driving data collected from vehicle operation sensors within at least one monitoring vehicle by a telematics device within the at least one monitoring vehicle, receive, from the telematics device of the monitoring vehicle, target vehicle driving data, receive user input from a driver of the at least one monitoring vehicle, the user input including an indication of a driving behavior of a driver of the target vehicle, perform an analysis of the monitoring vehicle driving data, the target vehicle driving data received from the telematics device of the monitoring vehicle, and the received user input, determine a driving behavior associated with the target vehicle based on the analysis of the monitoring vehicle driving data, the target vehicle driving data received from the telematics device of the monitoring vehicle, and the received user input, and output the determined driving behavior associated with the at least one target vehicle. In one aspect of the disclosure, the user input may be received from a mobile device of the driver of the at least one monitoring vehicle.

The details of these and other aspects of the disclosure are set forth in the accompanying drawings and description below. Other features and advantages of aspects of the disclosure will be apparent from the description and drawings. The driving analysis computing device may further receive data transmitted by the target vehicle to the at least one monitoring vehicle via vehicle-to-vehicle communications and display, via a graphical user interface, the data transmitted by the target vehicle. The user input received from the driver of the at least one monitoring vehicle may further include the identity of the target vehicle or the driver of the target vehicle

BRIEF DESCRIPTION OF THE DRAWINGS

Some embodiments are illustrated by way of example, and not by way of limitation, in the figures of the accompanying drawings. Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional.

FIGS. 4A-4E are diagrams illustrating examples of various driving behaviors that may be detected using vehicle-to-vehicle communications, according to one or more aspects of the disclosure.

FIG. 6 is a flow diagram illustrating an example method of analyzing vehicle driving data, determining driving behaviors, and calculating driver grades/scores, according to one or more aspects of the disclosure.

FIG. 7 is a flow diagram illustrating an example method of analyzing vehicle driving data, determining driving behaviors, and calculating driver grades/scores, according to one or more aspects of the disclosure.

FIG. 8 illustrates a user interface that may be displayed on a driving analysis computing device, according to one or more aspects of the disclosure.

FIG. 9 illustrates another user interface that may be displayed on a driving analysis computing device, according to one or more aspects of the disclosure.

DETAILED DESCRIPTION

Figure 1:
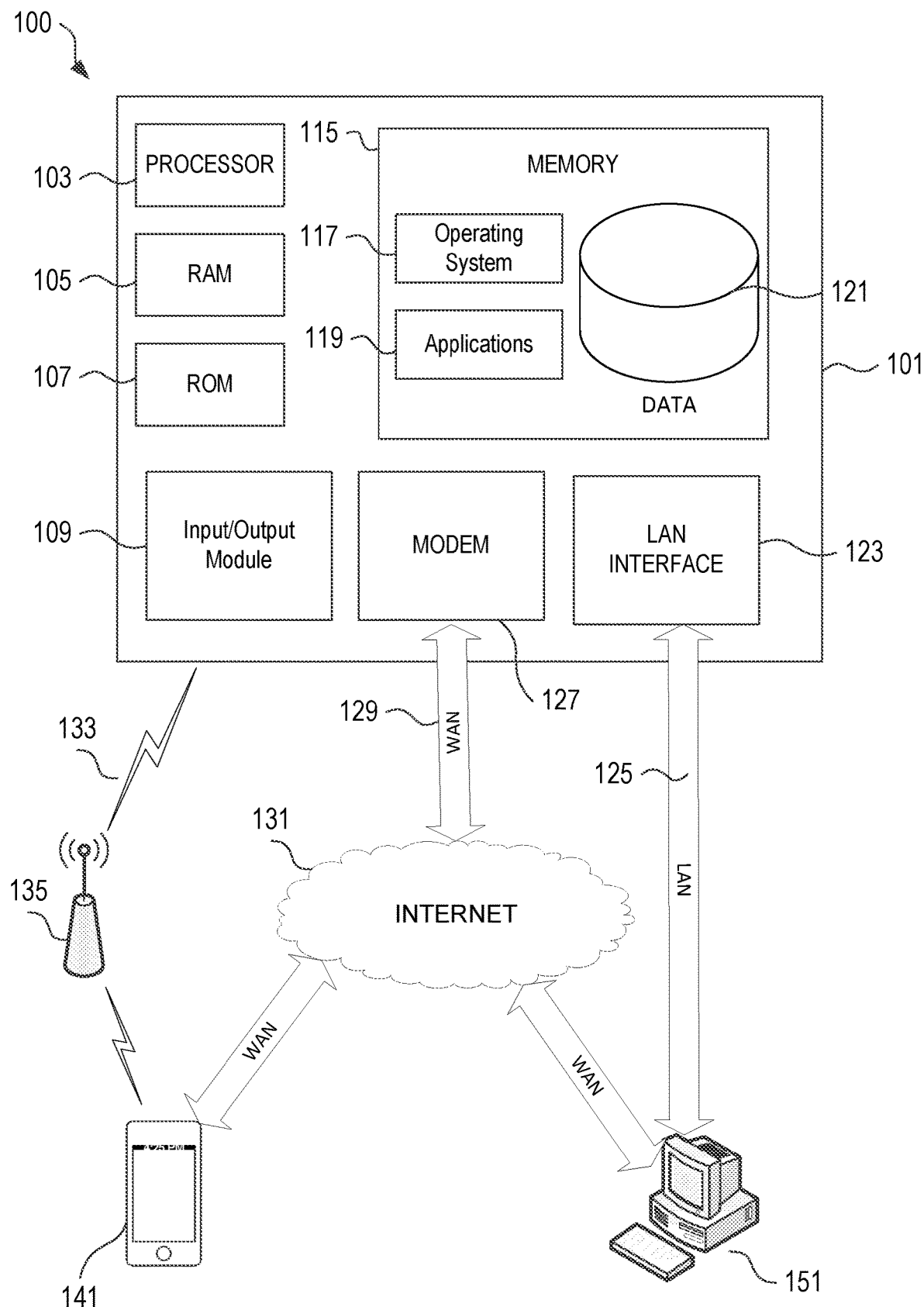
FIG. 1 illustrates a network environment and computing systems that may be used to implement one or more aspects of the disclosure.

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the present disclosure are directed toward methods, computer-readable media, software, systems and apparatuses that provide a vehicle-to-vehicle (V2V) communications system that may be used to collect data from other vehicles (e.g., target vehicles) and to grade the other vehicles or their drivers. Collecting data in this manner allows for an entity (e.g., an insurance provider) to collect data about/from vehicles that are not subscribers to the entity's telematics program (e.g., drivers who are customers of the insurance provider but do not subscribe to or participate in a telematics program, drivers who are not customers of the insurance provider (e.g., do not have an insurance policy with the insurance provider) and do not subscribe to or participate in a telematics program, or the like). Information collected regarding target vehicles can be used, for example, for the purposes of insurance rating, routing or car resale value.

In certain embodiments, the vehicle-to-vehicle communications system involves automated analysis of at least one moving vehicle (e.g., a target vehicle) by at least one other vehicle (e.g., a monitoring vehicle). The monitoring vehicle(s) may include vehicles associated with users who participate in a telematics program of an insurance provider (e.g., drivers who are customers of the insurance provider and subscribe to or participate in a telematics program, drivers who subscribe to or participate in a telematics program but are not customers of the insurance provider (e.g., do not have an insurance policy with the insurance provider), or the like). In some examples, participation in the telematics program may include downloading and running a V2V telematics application on a user mobile device and/or placing a telematics device in a vehicle. The monitoring vehicle(s) collect data (e.g., telematics data, the identity of the target vehicle or the driver of the target vehicle, etc.) from the target vehicle when the target vehicle is near the monitoring vehicles. In some variations, the collected data is used to calculate a grade and/or score for the target vehicle or driver of the target vehicle.

In other embodiments, the V2V system allows third-party users (e.g., drivers of monitoring vehicles, users who participate in a telematics program of an insurance provider, etc.) to manually provide information regarding at least one target vehicle and the particular behavior of the at least one target vehicle driver (e.g., the identity of the target vehicle or the driver of the target vehicle, one or more behaviors of the driver of the target vehicle (e.g., the driver of the target vehicle is driving erratically, eating, shaving, talking on a telephone, texting, using a mobile device, applying cosmetics, etc.), etc.) via a driving analysis computing device (e.g., a mobile device running a V2V telematics application). In certain variations, the information provided by the third-party user(s) may include a grade for the target vehicle or driver of the target vehicle. In some embodiments, the third-party user may manually input the information upon witnessing the particular behavior of the target vehicle, without any prompt from the driving analysis computing device. The driving analysis computing device may generate and display one or more driver behavior screens which depict one or more negative driving behaviors (vehicle hard braking, speeding, acceleration, sharp turns, eating, shaving, talking on a telephone, texting, using a mobile device, applying cosmetics, etc.). The information regarding the target vehicle(s) or driver of the target vehicle(s) may be input orally or by tapping on a portion of the driver behavior screen(s) corresponding to one or more negative driving behaviors of the driver of the target vehicle, as will be discussed more fully below.

In one or more embodiments, the vehicle-to-vehicle communications system involves a combination of manual third-party user analysis and automated analysis of at least one target vehicle by at least one monitoring vehicle. Using V2V communications, nearby vehicles transmit vehicle driving data (e.g., telematics data, the identity of the target vehicle or the driver of the target vehicle, etc.) to the driving analysis computing device. For instance, the vehicle data may be received from one or more vehicles or telematics devices associated with vehicles of users who are subscribers to an insurance provider's telematics program. Upon receiving the vehicle driving data from the target vehicle over V2V communications, the driving analysis computing device may prompt the third-party user to manually input, via a graphical user interface, information regarding the target vehicle or driver of the target vehicle. In certain instances, the driving analysis computing device display may first display the data transmitted by the other vehicle (e.g., a monitoring vehicle) to the user via the graphical user interface. Instead of, or in addition to displaying the data transmitted by the other vehicle to the user via the graphical user interface, the driving analysis computing device may generate and display one or more driver behavior screens which depict one or more negative driving behaviors (vehicle hard braking, speeding, acceleration, sharp turns, eating, shaving, talking on a telephone, texting, using a mobile device, applying cosmetics, etc.). The information regarding the target vehicle(s) or driver of the target vehicle(s) may be input orally or by tapping on a portion of the driver behavior screen(s) corresponding to one or more negative driving behaviors of the driver of the target vehicle.

FIG. 1 illustrates a block diagram of a computing device 101 in driving analysis communication system 100 that may be used according to one or more illustrative embodiments of the disclosure. The driving analysis device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as driving analysis computing devices or systems, configured as described herein for transmitting and receiving vehicle-to-vehicle (V2V) communications, analyzing vehicle driving data, determining driving behaviors, and calculating driver grades and/or scores, based on the V2V communications.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the driving analysis system 101 to execute a series of computer-readable instructions to transmit or receive vehicle driving data, analyze driving data, identify driving behaviors, and calculate driver grades and/or scores. In certain embodiments, the processor 103 and its associated components may allow the driving analysis system 101 to execute a series of computer-readable instructions to transmit or receive vehicle driving data of a non-customer/non-subscriber vehicle/driver (e.g., a driver not subscribed to an insurance provider's telematics program and/or not a customer of the insurance provider (e.g., do not have an insurance policy with the insurance provider)), analyze the driving data, identify driving behaviors, and calculate driver grades and/or scores for the non-subscriber/non-customer.

The driving analysis computing device 101 may operate in a networked environment 100 supporting connections to one or more remote computers, such as terminals/devices 141 and 151. Driving analysis computing device 101, and related terminals/devices 141 and 151, may include devices installed in vehicles (e.g., monitoring and/or target vehicle(s)), mobile devices that may travel within vehicles, or devices outside of vehicles that are configured to receive and process vehicle and driving data. Thus, the driving analysis computing device 101 and terminals/devices 141 and 151 may each include personal computers (e.g., laptop, desktop, or tablet computers), servers (e.g., web servers, database servers, etc.), vehicle-based devices (e.g., on-board vehicle computers, short-range vehicle communication systems, telematics devices, etc.), or mobile communication devices (e.g., mobile phones, portable computing devices, and the like), and may include some or all of the elements described above with respect to the driving analysis computing device 101. The network connections depicted in FIG. 1 include a local area network (LAN) 125 and a wide area network (WAN) 129, and a wireless telecommunications network 133, but may also include other networks.

When used in a LAN networking environment, the driving analysis computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the driving analysis computing device 101 may include computer executable instructions (e.g., driving behavior analysis programs, driver grade algorithms and driver score algorithms) for transmitting and receiving vehicle driving data, determining driving behaviors, calculating driver grades for one or more vehicles or drivers, calculating driver scores for one or more vehicles or drivers, and performing other related functions as described herein.

As used herein, a driver score (or driving score) may refer to a measurement of driving abilities, safe driving habits, and other driver information. A driver score may be a rating generated by an insurance provider, financial instruction, or other organization, based on the driver's age, vision, medical history, driving record, and/or other account data relating to the driver. For example, an insurance provider server may periodically calculate (e.g., adjust) driver scores for one or more of the insurance provider's customers, and may use the driver scores to perform insurance analyses and determinations (e.g., determine coverage, calculate premiums and deductibles, award safe driver discounts and rewards, etc.). Similarly, an insurance provider server may periodically evaluate drivers who are not subscribers of the insurance provider's telematics program and/or not customers of the insurance provider (e.g., do not have an insurance policy with the insurance provider). Scores related to the non-subscriber/non-customer drivers may be calculated or adjusted based on data received from other vehicles (e.g., monitoring vehicles), such as subscriber/customer vehicles. As discussed below, a driver score may be calculated based on driving data collected by a vehicle sensor(s) and telematics device(s), and/or additional data received from other nearby vehicles using vehicle-to-vehicle (V2V) communications. For example, if a driver consistently drives at a safe following distance, yields appropriately to approaching cars, and practices defensive avoidance while driving in traffic, then the driver may be given a high or positive driver score. Alternatively, if a driver regularly tailgates, cuts-off, or races with other cars in traffic, then the driver may be given a low or negative driver score.

It should be understood that a driver score, as used herein, may be associated with an individual, group of individuals, or a vehicle. For instance, in certain embodiments, a family, group of friends or co-workers, or other group that shares one or more vehicles may have a single driver score that is shared by the group. In one or more variations, a vehicle may have an associated driver score that is based on one or more primary drivers of the vehicle and can be affected by the driving behavior of any the vehicle's drivers. In other embodiments, a vehicle may be configured to identify different drivers, and each driver of the vehicle may have a separate driver score.

Figure 2:
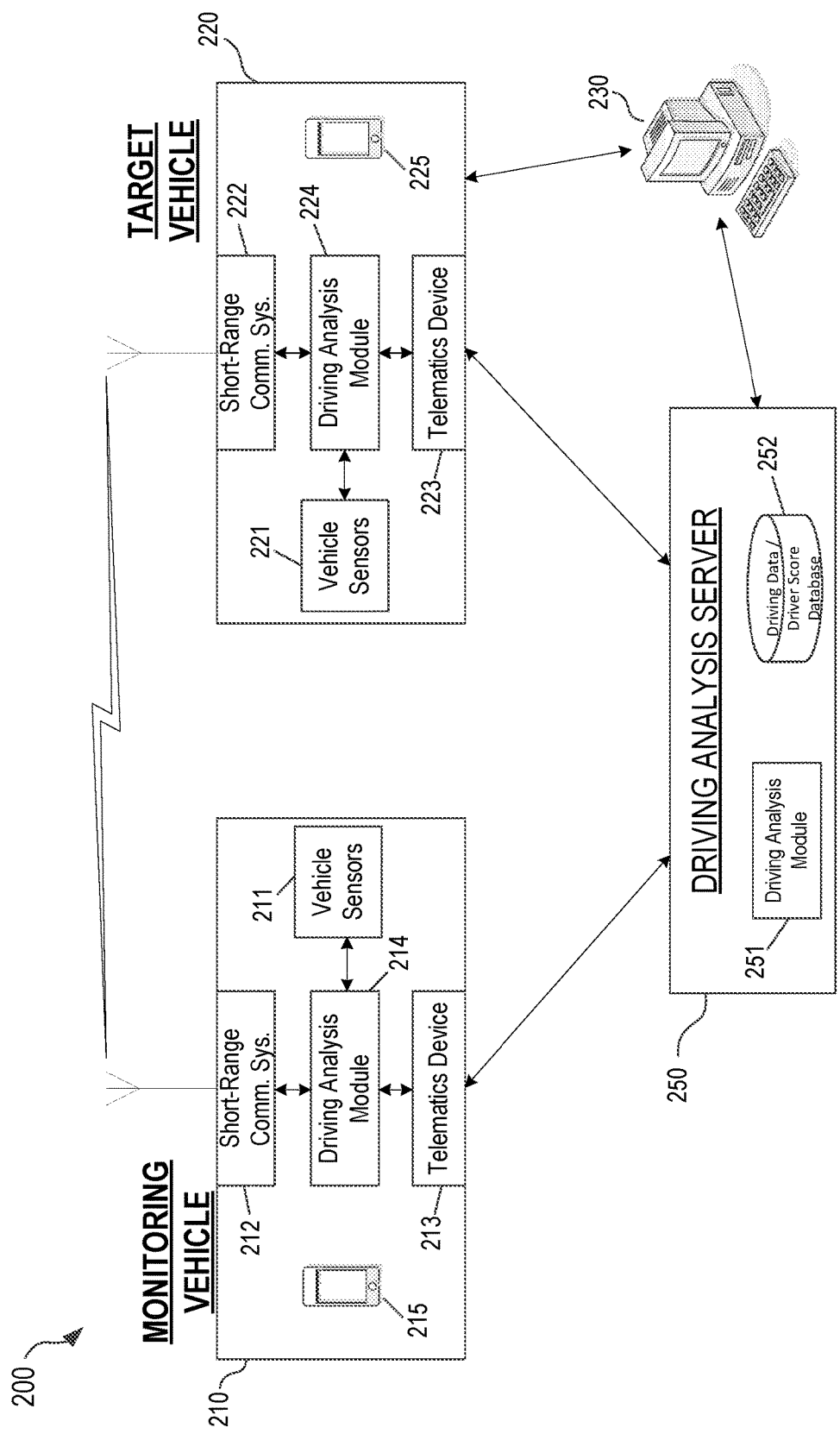
FIG. 2 is a diagram illustrating various components and devices of a driving analysis system, according to one or more aspects of the disclosure.

FIG. 2 is a diagram of an illustrative driving analysis system 200 including two vehicles 210 and 220, a driving analysis server 250, and additional related components. Each component shown in FIG. 2 may be implemented in hardware, software, or a combination of the two. Additionally, each component of the driving analysis system 200 may include a computing device (or system) having some or all of the structural components described above for computing device 101.

Vehicles 210 and 220 in the driving analysis system 200 may be, for example, automobiles, motorcycles, scooters, buses, recreational vehicles, boats, airplanes or other vehicles for which vehicle driving data may be analyzed and for which driver scores may be calculated. The vehicles 210 and 220 may or may not be insurance provider customers and/or may or may not be subscribers to the insurance provider's telematics program. In some embodiments, the vehicle 210 may be a monitoring vehicle and the user associated with the monitoring vehicle may be a customer of the insurance provider and a subscriber to the insurance provider's telematics program; while vehicle 220 may be a target vehicle of a user who is not a subscriber to the insurance provider's telematics program. In other embodiments, the vehicle 210 may be a monitoring vehicle and the user associated with the monitoring vehicle is a subscriber to the insurance provider's telematics program but is not a customer of the insurance provider (e.g., does not have an insurance policy with the insurance provider); while vehicle 220 may be a target vehicle of a user who is not a subscriber to the insurance provider's telematics program. In one or more embodiments, the target vehicle 220 is a customer of the insurance provider. In other variations, the target vehicle is not a customer of the insurance provider. The vehicles 210 and 220 each include vehicle operation sensors 211 and 221 capable of detecting and recording various conditions at the vehicle and operational parameters of the vehicle. For example, sensors 211 and 221 may detect and store data corresponding to the vehicle's location (e.g., GPS coordinates), speed and direction, rates of acceleration or braking, and specific instances of sudden acceleration, braking, and swerving. Sensors 211 and 221 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 211 and 221 may detect and store the external driving conditions, for example, external temperature, rain, snow, light levels, and sun position for driver visibility. For example, external cameras and proximity sensors 211 and 221 may detect other nearby vehicles, traffic levels, road conditions, traffic obstructions, animals, cyclists, pedestrians, and other conditions that may factor into a driving event data analysis. Sensors 211 and 221 also may detect and store data relating to moving violations and the observance of traffic signals and signs by the vehicles 210 and 220. Additional sensors 211 and 221 may detect and store data relating to the maintenance of the vehicles 210 and 220, such as the engine status, oil level, engine coolant temperature, odometer reading, the level of fuel in the fuel tank, engine revolutions per minute (RPMs), and/or tire pressure.

Vehicles sensors 211 and 221 also may include cameras and/or proximity sensors capable of recording additional conditions inside or outside of the vehicles 210 and 220. For example, internal cameras may detect conditions such as the number of the passengers, types of passengers (e.g. adults, children, teenagers, pets, etc.) and identity of passengers in the vehicles, and potential sources of driver distraction within the vehicle (e.g., pets, phone usage, unsecured objects in the vehicle, etc.). Sensors 211 and 221 also may be configured to collect data a driver's movements or the condition of a driver. For example, vehicles 210 and 220 may include sensors that monitor a driver's movements, such as the driver's eye position and/or head position, etc. Additional sensors 211 and 221 may collect data regarding the physical or mental state of the driver, such as fatigue or intoxication. The condition of the driver may be determined through the movements of the driver or through other sensors (e.g., sensors that detect alcohol content in the air or blood alcohol content of the driver, such as a breathalyzer).

Certain vehicle sensors 211 and 221 also may collect information regarding the driver's route choice, whether the driver follows a given route, and to classify the type of trip (e.g. commute, errand, new route, etc.). In certain embodiments, sensors and/or cameras 211 and 221 may determine when and how often the vehicles 210 and 220 stay in a single lane or stray into other lanes. A Global Positioning System (GPS), locational sensors positioned inside the vehicles 210 and 220, and/or locational sensors or devices external to the vehicles 210 and 220 may be used to determine the route, lane position, and other vehicle position/location data.

The data collected by vehicle sensors 211 and 221 may be stored and/or analyzed within the respective vehicles 210 and 220, and/or may be transmitted to one or more external devices. For example, as shown in FIG. 2, sensor data may be transmitted via short-range communication systems 212 and 222 to other nearby vehicles. Additionally, the sensor data may be transmitted via telematics devices 213 and 223 to one or more remote computing devices, such as driving analysis server 250.

Short-range communication systems 212 and 222 are vehicle-based data transmission systems configured to transmit vehicle operational data to other nearby vehicles, and to receive vehicle operational data from other nearby vehicles. In some embodiments, communication systems 212 and 222 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 212 and 222 need not use DSRC, and may be implemented using other short-range wireless protocols in other embodiments, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 212 and 222 may be sent via DSRC, Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers) or may be implemented by software running on the mobile devices 215 and 225 of drivers and passengers within the vehicles 210 and 220.

The range of V2V communications between vehicle communication systems 212 and 222 may depend on the wireless communication standards and protocols used, the transmission/reception hardware (e.g., transceivers, power sources, antennas, etc.), and other factors. Short-range V2V communications may range from just a few feet to many miles, and different types of driving behaviors may be determined depending on the range of the V2V communications. For example, V2V communications ranging only a few feet may be sufficient for a driving analysis computing device 101 in one vehicle to determine that another vehicle is tailgating or cut-off the vehicle, whereas longer communications may allow the device 101 to determine additional types of driving behaviors (e.g., yielding, defensive avoidance, proper response to a safety hazard, etc.).

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, every 10 seconds, every 20 seconds, every 30 seconds, etc.) certain vehicle operation data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle operation data to the other vehicles and/or devices.

The types of vehicle operational data, or vehicle driving data, transmitted by vehicles 210 and 220 may depend on the protocols and standards used for the V2V communication, the range of communications, and other factors. In certain examples, vehicles 210 and 220 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's 210 internal systems that the vehicle is skidding, that an impact has occurred, or that the vehicle's airbags have been deployed, also may be transmitted in V2V communications. In various other examples, any data collected by any vehicle sensors 211 and 221 potentially may be transmitted via V2V communication to other nearby vehicles or infrastructure devices receiving V2V communications from communication systems 212 and 222. Further, additional vehicle driving data not from the vehicle's sensors (e.g., vehicle make/model/year information, driver insurance information, driving route information, vehicle maintenance information, driver scores, etc.) may be collected from other data sources, such as a driver's or passenger's mobile device 215 or 225, driving analysis server 250, and/or another external computer system 230, and transmitted using V2V communications to nearby vehicles and other receiving devices using communication systems 212 and 222.

As shown in FIG. 2, the data collected by vehicle sensors 211 and 221 also may be transmitted to a driving analysis server 250, and one or more additional external servers and devices via telematics devices 213 and 223. Telematics devices 213 and 223 may be computing devices containing many or all of the hardware/software components as the computing device 101 depicted in FIG. 1. As discussed above, the telematics devices 213 and 223 may receive vehicle operation data and driving data from vehicle sensors 211 and 221, and may transmit the data to one or more external computer systems (e.g., driving analysis server 250 of an insurance provider, financial institution, or other entity) over a wireless transmission network. Telematics devices 213 and 223 also may be configured to detect or determine additional types of data relating to real-time driving and the condition of the vehicles 210 and 220. In certain embodiments, the telematics devices 213 and 223 may contain or may be integral with one or more of the vehicle sensors 211 and 221. The telematics devices 213 and 223 also may store the type of their respective vehicles 210 and 220, for example, the make, model, trim (or sub-model), year, and/or engine specifications, as well as other information such as vehicle owner or driver information, insurance information, and financing information for the vehicles 210 and 220.

In the embodiment shown in FIG. 2, telematics devices 213 and 223 may receive vehicle driving data from vehicle sensors 211 and 221, and may transmit the data to a driving analysis server 250. However, in other embodiments, one or more of the vehicle sensors 211 and 221 may be configured to transmit data directly to a driving analysis server 250 without using a telematics device. For instance, telematics devices 213 and 223 may be configured to receive and transmit data from certain vehicle sensors 211 and 221, while other sensors may be configured to directly transmit data to a driving analysis server 250 without using the telematics devices 213, 223. Thus, telematics devices 213 and 223 may be optional in certain embodiments.

In certain embodiments, mobile computing devices 215 and 225 within the vehicles 210 and 220 may be used to collect vehicle driving data and/or to receive vehicle driving data from sensors 211 and 221, and then to transmit the vehicle driving data to the driving analysis server 250 and other external computing devices. Mobile computing devices 215 and 225 may be, for example, mobile phones, personal digital assistants (PDAs), or tablet computers of the drivers or passengers of vehicles 210 and 220. Software applications executing on mobile devices 215 and 225 may be configured to detect certain driving data independently and/or may communicate with vehicle sensors 211 and 221 to receive additional driving data. For example, mobile devices 215 and 225 equipped with GPS functionality may determine vehicle location, speed, direction and other basic driving data without needing to communicate with the vehicle sensors 211 or 221, or any vehicle system. In other examples, software on the mobile devices 215 and 225 may be configured to receive some or all of the driving data collected by vehicle sensors 211 and 221.

When mobile computing devices 215 and 225 within the vehicles 210 and 220 are used to detect vehicle driving data and/or to receive vehicle driving data from vehicles 211 and 221, the mobile computing devices 215 and 225 may store, analyze, and/or transmit the vehicle driving data to one or more other devices. For example, mobile computing devices 215 and 225 may transmit vehicle driving data directly to one or more driving analysis servers 250, and thus may be used in conjunction with or instead of telematics devices 213 and 223. Additionally, mobile computing devices 215 and 225 may be configured to perform the V2V communications described above, by establishing connections and transmitting/receiving vehicle driving data to and from other nearby vehicles. Thus, mobile computing devices 215 and 225 may be used in conjunction with or instead of short-range communication systems 212 and 222 in some embodiments. Moreover, the processing components of the mobile computing devices 215 and 225 may be used to analyze vehicle driving data, determine driving behaviors, calculate driver scores, and perform other related functions. Therefore, in certain embodiments, mobile computing devices 215 and 225 may be used in conjunction with, or in place of, the driving analysis modules 214 and 224.

Vehicles 210 and 220 may include driving analysis modules 214 and 224, which may be separate computing devices or may be integrated into one or more other components within the vehicles 210 and 220, such as the short-range communication systems 212 and 222, telematics devices 213 and 223, or the internal computing systems of vehicles 210 and 220. In some embodiments, vehicle 220 is a target vehicle and does not include a driving analysis module 224. As discussed above, driving analysis modules 214 and 224 also may be implemented by computing devices independent from the vehicles 210 and 220, such as mobile computing devices 215 and 225 of the drivers or passengers, or one or more separate computer systems 230 (e.g., a user's home or office computer). In any of these examples, the driving analysis modules 214 and 224 may contain some or all of the hardware/software components as the computing device 101 depicted in FIG. 1. Further, in certain implementations, the functionality of the driving analysis modules, such as storing and analyzing vehicle driving data, determining driving behaviors, and calculating driving scores, may be performed in a central driving analysis server 250 rather than by individual vehicles 210 and 220. In such implementations, the vehicles 210 and 220 might only collect and transmit vehicle driving data to a driving analysis server 250, and thus the vehicle-based driving analysis modules 214 and 224 may be optional.

Driving analysis modules 214 and 224 may be implemented in hardware and/or software configured to receive vehicle driving data from vehicle sensors 211 and 221, short-range communication systems 212 and 222, telematics devices 213 and 223, and/or other driving data sources. After receiving the vehicle driving data, driving analysis modules 214 and 224 may perform a set of functions to analyze the driving data, determine driving behaviors, and calculate driver scores. For example, the driving analysis modules 214 and 224 may include one or more driving behavior analysis/ driver score calculation algorithms, which may be executed by software running on generic or specialized hardware within the driving analysis modules. The driving analysis module 214 in a monitoring vehicle 210 may use the vehicle driving data received from that vehicle's sensors 211, along with vehicle driving data for other nearby vehicles received via the short-range communication system 212, to determine driving behaviors and calculate driver scores applicable to the monitoring vehicle 210 and the other nearby vehicles. Within the driving analysis module 214, a driver score calculation function may use the results of the driving analysis performed by the module 214 to calculate/adjust driver scores for a driver of a vehicle 210 or other vehicles based on determined driving behaviors. Further descriptions and examples of the algorithms, functions, and analyses that may be executed by the driving analysis modules 214 and 224 are described below in reference to FIGS. 3 and 4.

The system 200 also may include a driving analysis server 250, containing some or all of the hardware/software components as the computing device 101 depicted in FIG. 1. The driving analysis server 250 may include hardware, software, and network components to receive vehicle driving data from one or more vehicles 210 and 220, and other data sources. The driving analysis server 250 may include a driving data and driver score database 252 and driving analysis module 251 to respectively store and analyze driving data received from vehicles and other data sources. The driving analysis server 250 may initiate communication with and/or retrieve driving data from vehicles 210 and 220 wirelessly via telematics devices 213 and 223, mobile devices 215 and 225, or by way of separate computing systems (e.g., computer 230) over one or more computer networks (e.g., the Internet). Additionally, the driving analysis server 250 may receive additional data relevant to driving behavior determinations and driver score calculations from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.)

Data stored in the driving data and driver score database 252 may be organized in any of several different manners. For example, a table in database 252 may contain all of the vehicle operation data for a specific vehicle 210, similar to a vehicle event log. Other tables in the database 252 may store certain types of data for multiple vehicles. For instance, tables may store specific driving behaviors and interactions (e.g., accidents, tailgating, cutting-off, yielding, racing, defensive avoidances, etc.) for multiples vehicles. Vehicle driving data may also be organized by time and/or place, so that the driving behaviors or interactions between multiples vehicles 210 and 220 may be stored or grouped by time and location.

The driving analysis module 251 within the driving analysis server 250 may be configured to retrieve data from the driving data and driver score database 252, or may receive driving data directly from vehicles 210 and 220 or other data sources, and may perform driving data analyses, driving behavior determinations, driver score calculations, and other related functions. The functions performed by the driving analysis module 251 may be similar to those of driving analysis modules 214 and 224, and further descriptions and examples of the algorithms, functions, and analyses that may be executed by the driving analysis module 251 are described below in reference to FIGS. 3 and 4.

In various examples, the driving data analyses, driving behavior determinations, and driving score calculations may be performed entirely in the driving analysis module 251 of the driving analysis server 250 (in which case driving analysis modules 214 and 224 need not be implemented in vehicles 210 and 220), or may be performed entirely in the vehicle-based driving analysis modules 214 and 224 (in which case the driving analysis module 251 and/or the driving analysis server 250 need not be implemented). In other examples, certain driving data analyses may be performed by vehicle-based driving analysis modules 214 and 224, while other driving data analyses are performed by the driving analysis module 251 at the driving analysis server 250. For example, a vehicle-based driving analysis module 214 may continuously receive and analyze driving data from nearby vehicles to determine certain driving behaviors (e.g., tailgating, cutting-off, yielding, etc.) so that large amounts of driving data need not be transmitted to the driving analysis server 250. However, after a positive or negative driving behavior is determined by the vehicle-based driving analysis module 214, the behavior may be transmitted to the server 250, and the driving analysis module 251 may determine if a driver score should be updated based on the determined driving behavior.

Figure 3:
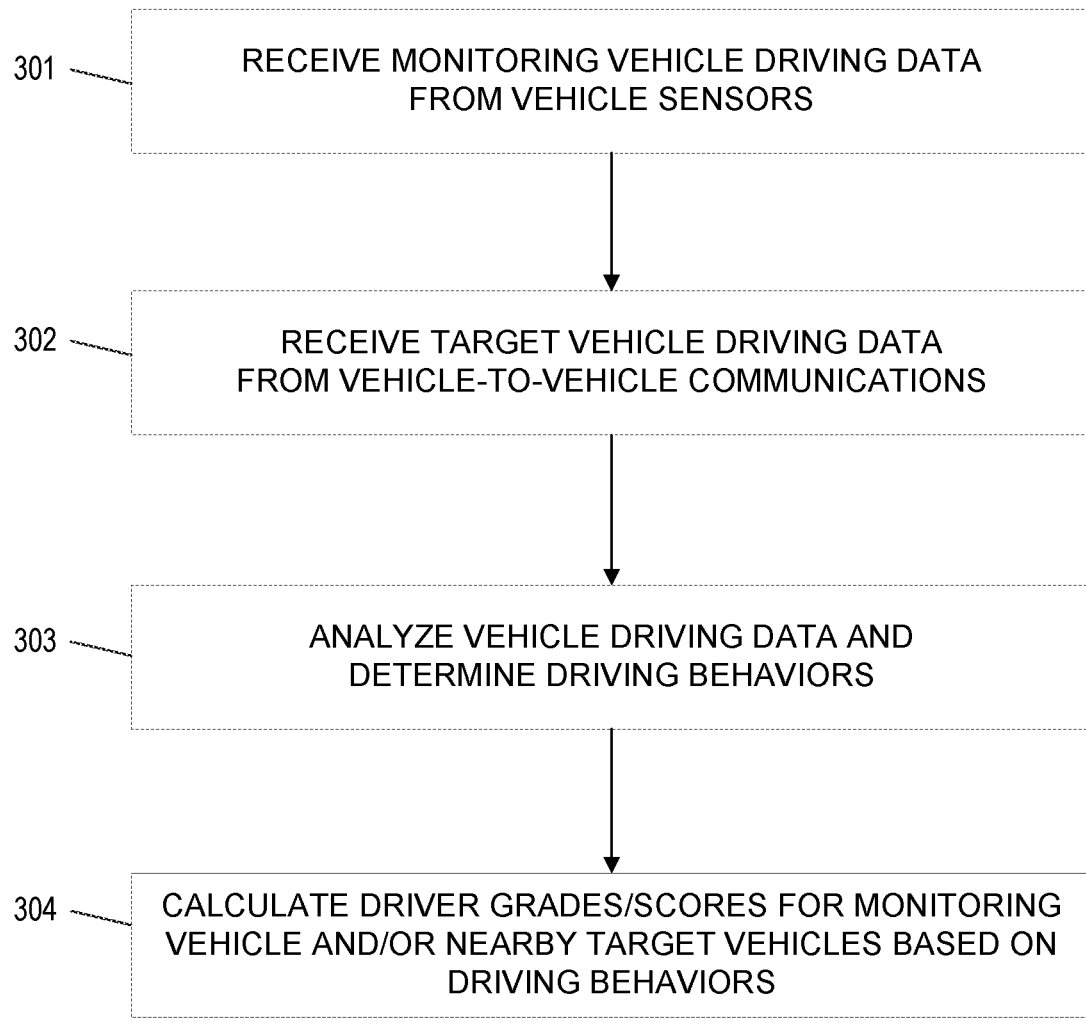
FIG. 3 is a flow diagram illustrating an example method of analyzing vehicle driving data, determining driving behaviors, and calculating driver grades/scores using vehicle-to-vehicle communications, according to one or more aspects of the disclosure.

FIG. 3 is a flow diagram illustrating an example method of performing driving behavior determinations and driver scores calculations based on analyses of vehicle driving data from vehicle-to-vehicle communications. This example method may be performed by one or more computing devices in a driving analysis system, such as vehicle-based driving analysis modules 214 and 224, a driving analysis module 251 of a driving analysis server 250, user mobile computing devices 215 and 225, and/or other computer systems.

The steps shown in FIG. 3 describe performing an analysis to determine driving behaviors of vehicles using V2V communications, and then calculating or adjusting driver scores based on the determined driving behaviors. As described above in reference to FIG. 2, the vehicles 210 and 220 may or may not be insurance provider customers and/or may or may not be subscribers to the insurance provider's telematics program. In some embodiments, the monitoring vehicle 210 is a customer of the insurance provider and a subscriber to the insurance provider's telematics program; while the target vehicle 220 is a customer of the insurance provider who is not a subscriber to the insurance company's telematics program. In other variations, the target vehicle is a subscriber to the insurance company's telematics program and/or not a customer of the insurance provider. Driving behaviors may include any number of identifiable "social interactions" between two or more vehicles on the road, including negative behaviors such as tailgating, cutting-off, brake-checking, preventing another vehicle from merging, and racing, or positive behaviors such as yielding, defensive avoidance, or allowing another vehicle to merge. Occurrences of negative driving behaviors may indicate a high-risk or unsafe driver, while occurrences of positive driving behaviors may indicate a low-risk or safe driver. In some cases, a monitoring vehicle 210 might not be actively involved in a driving behavior, but may be involved only as an object of another vehicle's 220 driving behavior (e.g., a vehicle 210 being tailgated by another vehicle 220, or a vehicle 210 allowed to merge by another vehicle 220), in which case the determination of the driving behavior may be neither positive nor negative with respect to vehicle 210.

In step 301, vehicle driving data may be received for a monitoring vehicle 210, corresponding to data from the vehicle's sensors 211. As described above in reference to FIG. 2, a driving analysis module 214 within vehicle 210 may receive and store vehicle driving data from the vehicle's internal computer systems and any combination of the vehicle's sensors 211. The data received in step 301 may include, for example, the location, speed, and direction of the vehicle 210, object proximity data from the vehicle's external cameras and proximity sensors, and data from the vehicle's various systems used to determine if the vehicle 210 is braking, accelerated, or turning, etc., and to determine the status of the vehicle's user-operated controls (e.g., head lights, turn signals, hazard lights, radio, phone, etc.), along with any other data collected by vehicle sensors 211.

In step 302, vehicle driving data may be received for at least one target vehicle 220, corresponding to data transmitted via V2V communications. As described above, vehicle driving data may be transmitted from the at least one target vehicle 220 to the monitoring vehicle 210 using short-range communications systems 212 and 222, user mobile devices 215 and 225, or other wireless transmission techniques. In certain examples, DSRC protocols and standards may be used, in which vehicle 220 may periodically broadcast a set of vehicle driving data to any vehicles or other receiving devices within its broadcast range. In some examples, driving data transmitted by vehicle 220 using V2V communication may include basic vehicle location, speed, and trajectory data, such as the GPS coordinates, speed and direction of travel, rate of acceleration or deceleration, and rates of turning data of the vehicle 210. However, the V2V communications may include additional data in various other examples, and may potentially include any or all of the data collected from the vehicle's sensors 221. Additionally, after two vehicles 210 and 220 have established a communication link via short-range communication systems 212 and 222, the vehicles may transmit their bearings (or relative direction) vis-à-vis the other vehicle in V2V communications. In other examples, the monitoring vehicle 210 may determine the bearing of at least one nearby target vehicle 220 by storing and analyzing multiple V2V transmissions from the vehicle 220 over a period of time.

In step 303, the vehicle driving data received in steps 301 and 302 may be analyzed, and driving behaviors may be determined for the vehicles 210 and 220 based on the driving data. For example, a driving analysis module 214 in a monitoring vehicle 210 may compare the driving data (e.g., location, speed, direction) from its own vehicle sensors 211 (received in step 301) with the corresponding driving data (e.g., location, speed, direction, etc.) from a nearby vehicle 220 (received in step 302). Based on the relative locations, speeds, and directions of travel of vehicles 210 and 220, the driving analysis module 214 may determine a driving behavior involving the two vehicles.

Figure 4C:
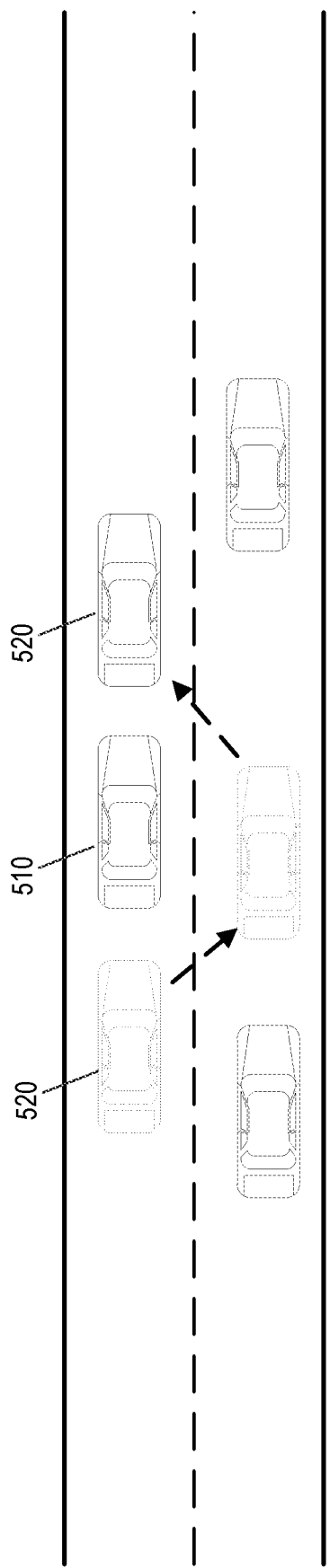

FIGS. 4A-4E illustrate examples of different "social interactions" between two vehicles that may characterize different driving behaviors in step 303. In FIG. 4A, an example of tailgating is shown in which vehicle 520 (e.g., a non-subscriber and/or non-customer target vehicle) is tailgating vehicle 510 (e.g., a subscriber and/or customer monitoring vehicle). A driving analysis module 214, 224 in either vehicle 510 or 520 may detect tailgating in step 303 by comparing the relative positions, speeds, and distances between the two vehicles over a period of time. One or more driving behavior algorithms executed by a driving analysis module 214, 224 may define tailgating in terms of vehicle speed and following distance. For example, a tailgating algorithm may determine that a vehicle is tailgating (T) if its following distance in feet (D), is less than its velocity in miles-per-hour (V) times a tailgating factor, such as: [If D<V, then T], [If D>V*1.1, then T], [If D<V*1.5, then T], or [If D<V*2, then T], etc. The amount of time that a vehicle is tailgating may also factor into a determination of a tailgating behavior. For example, if the driving analysis module 214, 224 determines that a vehicle's tailgating exceeds a time threshold, which may be consecutive number of seconds tailgating (e.g., 5 seconds, 10 seconds, 30 seconds, 45 seconds, 60 seconds, etc.), a percentage of driving time tailgating (e.g., 10%, 20%, 50%, 60%, 75%, etc.), or a total amount of tailgating time in an hour, day, or driving trip (e.g., 1 minute, 5 minutes, 10 minutes, 30 minutes, 1 hour, etc.), then the driving analysis module 214, 224 may determine that the target vehicle (e.g., the vehicle of the non-subscriber and/or non-customer) has engaged in a tailgating driving behavior.

In FIG. 4B, an example of defensive avoidance is shown, in which vehicle 510 changes lanes to avoid being tailgated by vehicle 520. A driving analysis module 214, 224 in either vehicle 510 or 520 may detect defensive avoidance by vehicle 510 in step 303, by executing one or more algorithms that define a defensive avoidance driving behavior. For example, if a vehicle is being tailgated (as defined by one or more tailgating algorithms) for at least a minimum time threshold (e.g., 1 second, 5 seconds, 10 seconds, 30 seconds, 45 seconds, 60 seconds, etc.), and then the vehicle being tailgated safely changes lanes to eliminate the tailgating situation, then the driving analysis module 214, 224 may determine that the vehicle has engaged in a defensive avoidance driving behavior. Determinations of defensive avoidance by driving analysis modules 214, 224 also may take into account traffic density. For example, when a current traffic density is greater than a predetermined density threshold, the amount of time that vehicle 510 is given to change lanes in order to count as a defensive avoidance driving behavior may be increased.

In FIG. 4C, an example is shown in which vehicle 520 has cut-off vehicle 510, by changing lanes closely in front of vehicle 510. A driving analysis module 214, 224 may detect cutting-off in step 303 by comparing the relative positions and distances between the two vehicles over a period of time. For example, one or more driving behavior algorithms may define cutting-off as occurrence of a lane change immediately after which the following vehicle is in a tailgating position (as defined by one or more tailgating algorithms). For instance, under the tailgating algorithm [If D>V, then T], if vehicle 520 changes lanes in front of vehicle 510 when both cars are traveling 60 MPH, and the distance between the two vehicles immediately after the lane change is less than 60 feet, then the driving analysis module 214, 224 may determine that vehicle 520 has cut-off vehicle 510. In certain implementations, the following vehicle 510 may be provided a tailgating grace period (e.g., 5 seconds, 10 seconds, 15 seconds, 20 seconds, 25 seconds, 30 seconds, etc.) after being cut-off, to allow it increase its following distance, before it can be assessed (or begin to be assessed) with a tailgating driving behavior.

Figure 4D:
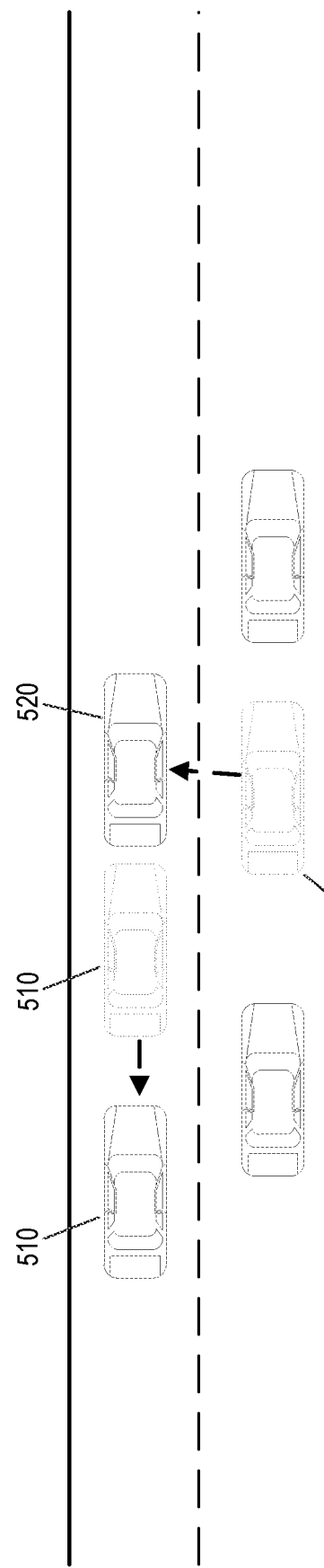

In FIG. 4D, an example of yielding is shown in which vehicle 510 yields to vehicle 520, allowing vehicle 520 to merge into the lane of vehicle 510. As with tailgating and cutting-off, a driving analysis module 214, 224 may determine yielding in step 303 by comparing the relative positions, speeds, and distances between the two vehicles over a period of time. For example, if vehicle 520 expresses an intention to change into the same lane as vehicle 510, and vehicle 510 maintains or reduces speed to safely allow the lane change, then driving analysis module 214, 224 may determine that vehicle 510 has performed a yielding driving behavior. Expressions of intention to change lanes may be determined by, for example, based on speed matching by a vehicle 520 in an adjacent lane, turn signal usage of a vehicle 520 in an adjacent lane (using turn signal data and other vehicle control data transmitted in V2V communications), the ending of an upcoming lane in traffic (using lane ending determinations by vehicle sensors, GPS and navigation data, or other techniques). After a driving analysis module 214, 224 identifies an intention of a nearby vehicle to change lanes, if the vehicle 510 slows down or maintains its speed, so that its following distance is increased to exceed a yielding distance threshold (e.g., V*1.5, V*2, etc.), or so that after the lane change is completed then vehicle 520 will not be in a tailgating position, then the vehicle 510 may be attributed with a positive yielding driving behavior. To the contrary, if vehicle 510 speeds up or decreases its current following distance to prevent the lane change, then vehicle 510 may be attributed with a negative driving behavior for preventing the merging of vehicle 520.

Figure 4E:
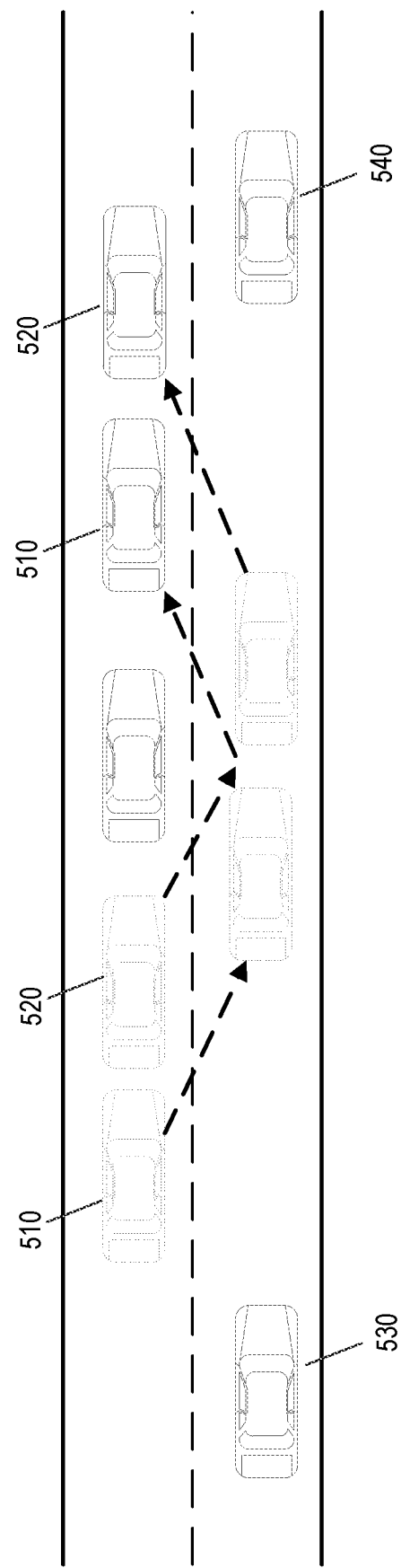

In FIG. 4E, an example is shown of racing by vehicles 510 and 520. As in the examples above, a driving analysis module 214, 224 may detect racing in step 303 by comparing the relative positions, speeds, and distances between the two vehicles 510 and 520 over a period of time, as well as data from other vehicles 530 and 540, and other data sources. For example, one or more driving behavior algorithms may define racing as an occurrence of two or more vehicles 510 and 520 in close proximity to one another (for example, using a proximity threshold, e.g., 100 feet, 0.25 miles, 0.5 miles, 1 mile, etc.), over a period of time (e.g., 30 seconds, 1 minute, etc.), and when the vehicles 510 and 520 are moving faster than the other traffic on the same road by more than a racing speed threshold (e.g., 25% faster, 50% faster, etc.).

In addition to the driving behaviors described above, and the various examples of algorithms and thresholds used to determine occurrences of these driving behaviors, it should be understood that other types of driving behaviors may be detected using V2V communications, and that various other driving behavior determination algorithms and different threshold values may be used as well. For example, other types of driving behaviors that may be detected using V2V communications include hard turning, U-turns, braking, time of day a vehicle is being driven, speeding (i.e. how fast a vehicle is going and how often a vehicle is speeding), annual mileage (this may be determined based on how often a vehicle is spotted by fleet vehicles and the locations in which the vehicle is spotted by fleet vehicles). Additionally, the driving behaviors described above, or other driving behaviors determined in step 303 may use multiple algorithms and/or thresholds to determine degrees of magnitude for a driving behavior. For example, when determining negative driving behaviors such as tailgating, cutting-off, and racing, a driving analysis module 214, 224 may use different thresholds to determine different levels of severity of the negative behavior. For instance, tailgating under the definition of [If D<V*1.5, then T] for between 5-10 seconds may be considered a minor tailgating behavior, whereas tailgating under the definition of [If D<V*0.7, then T] for more than a minute consecutively may be considered a severe tailgating behavior, and so on. The driving behaviors determined for the target vehicle may be tagged with information identifying the target vehicle. The tagged driving vehicle behavior data may be stored in driving data and driver score database 252.

In step 304, one or more driver scores may be calculated based on the driving behaviors determined in step 303. As discussed above, driver scores and/or grades may correspond to ratings by insurance companies, financial institutions, or other organizations of the driving abilities, safe/unsafe driving habits, and other information for a driver or a related group of drivers (e.g., family, roommates, co-workers, or other group of drivers associated with the same vehicle or vehicles). Driver scores and/or grades may be used to help obtain vehicle financing and determine insurance, rates, coverage, and discounts. A driver score and/or grade for a non-customer and/or non-subscriber may be calculated, for instance, based on the data from the monitoring vehicle/driver and that grade and/or score may be used to make an offer for insurance to the non-customer and/or non-subscriber. A driver score may be based on driver grades. For instance, monitoring vehicle drivers may grade the target vehicle or target vehicle driver. These grades may be aggregated to determine the driver score of the target vehicle. If a driving analysis module 214, 224 determines a "negative" (e.g., unsafe or risky) driving behavior for a driver of vehicle 220 in step 303, then the driving analysis module 214, 224 may negatively adjust the driver's driver score and/or grade in step 304. Similarly, if the driving analysis module 214, 224 determines a "positive" or safe driving behavior in step 303, then the driving analysis module 214, 224 may positively adjust the driver score and/or grade in step 304. When calculating or adjusting a driver score and/or grade based on determined driving behaviors, behaviors of greater magnitude (e.g., severe tailgating or racing) may be weighed more heavily than less severe behaviors (e.g., minor tailgating or failure to yield to allow a lane change in traffic). Additionally, minor driving behaviors might not cause any adjustments in driver scores, and some positive and negative behaviors may cancel out so that the driver score might not be adjusted. In some cases, all occurrences of all determined positive and negative driving behaviors may be accumulated and stored over a period of time, such a week, month, year, or for an insurance term, and the accumulated set of driving behaviors may be used to calculate insurance rate adjustments or discounts, along with other factors such as accidents, vehicle maintenance, and driving record. When a specific driver of a vehicle 220 is known, the driving analysis module 214, 224 may calculate or update a driver score for that specific driver. Otherwise, the driving analysis module 214, 224 may calculate or update a driver score corresponding to the vehicle 220 and/or multiple driver scores for different drivers of the vehicle.

As shown in FIG. 3, a single vehicle-based driving analysis module 214 may receive driving data for a monitoring vehicle 210 (step 301), may receive V2V communications including driving data for one or more other vehicles (e.g., target vehicle(s)) (step 302), may determine driving behaviors (step 303), and may calculate or update driver scores (step 304) for the monitoring vehicle 210. However, other driving analysis modules and/or other computing devices may be used to execute some or all of the steps and functionality described above in reference to FIG. 3. For example, any of steps 301-304 may be performed by a user's mobile device 215 or 225 within the vehicles 210 or 220. These mobile devices 215 or 225, or another computing device 230, may execute software configured to perform similar functionality in place of the driving analysis modules 214 and 224. Additionally, some or all of the driving analysis functionality described in reference to FIG. 3 may be performed by a driving analysis module 251 at a non-vehicle based driving analysis server 250. For example, vehicles 210 and 220 may be configured to transmit their own vehicle sensor data, and/or the V2V communications data received from other nearby vehicles, to a central driving analysis server 250 via telematics devices 213 and 223. In this example, the driving analysis module 251 of the server 250 may perform the data analysis, determinations of driving behaviors, and driver score and/or grade calculations for any vehicles 210 and 220 for which it receives driving data. In certain embodiments, vehicle 220 is a non-subscriber and/or non-customer and only vehicle 210 (e.g., the monitoring vehicle) contains a telematics device 213 and/or driving analysis module 214 (and/or other computing device, such as a mobile device or the like).

In some examples, certain functionality may be performed in vehicle-based driving analysis modules 214 and/or 224, while other functionality may be performed by the driving analysis module 251 at the driving analysis server 250. For instance, vehicle-based driving analysis modules 214 and 224 may continuously receive and analyze driving data for their own vehicles 210 and 220 and nearby vehicles (via V2V communications), and may determine driving behaviors (e.g., tailgating, cutting-off, yielding, racing, etc.) for their own vehicles 210 and 220 and/or the other nearby vehicles. In certain embodiments, vehicle 220 is a non-subscriber and/or non-customer and only vehicle 210 (e.g., the monitoring vehicle) includes a vehicle-based driving analysis module 214 which may continuously receive and analyze driving data for its own vehicle 210 and nearby vehicles (via V2V communications), and may determine driving behaviors (e.g., tailgating, cutting-off, yielding, racing, etc.) for its own vehicle 210 and/or the other nearby vehicles. After the vehicle-based driving analysis modules 214 and/or 224 have determined the driving behaviors, indications of these behaviors may be transmitted to the server 250 so that the driving analysis module 251 can perform the driver score calculations and updates based on the driving behaviors. For instance, vehicles 210 and 220 both may detect a negative driving behavior for a third vehicle, and may report the negative behavior for the third vehicle to the driving analysis server 250, which may access other vehicle and driver information for the third vehicle and may potentially adjust a driver score for the third vehicle based on the driving behaviors reported by vehicles 210 and 220. Additionally, in some examples, a monitoring vehicle 210 (or V2V receiving infrastructure device, such a roadside receiver at a tollbooth or traffic monitor) may receive V2V communications from multiple other vehicles and determine driving behaviors for those other vehicles, even when the monitoring vehicle 210 (or other receiving device) is not directly involved in the driving behavior. In such cases, indications of the determined driving behaviors may be transmitted to the vehicles involved and/or to an external system (e.g., driving analysis server 250) for the calculation and implementation of driver scores for the vehicles involved. Additionally, in some embodiments, any analysis that might be performed at the driving analysis server 250 may be performed instead within the vehicles, for example, in driving analysis modules 214 and/or 224. For instance, a monitoring vehicle may analyze the driving behaviors of at least one target vehicle and transmit the determined driving behavior data to the at least one target vehicle and/or additional vehicles (e.g., other monitoring vehicles). Thus, the driving analysis server 250 may be optional in certain embodiments, and some or all of the driving analyses may be performed within the vehicles themselves.

V2V communication may be used to analyze driving interactions and driving behaviors between two vehicles (e.g., vehicles 210 and 220), as discussed above. In other examples, similar techniques may be used to analyze driving interactions and driving behaviors between three or more vehicles. For instance, racing between three or more vehicles may be detected using similar techniques of V2V communication between each of the vehicles. Additional complex driving interactions may be detected using V2V communications between three or more vehicles. For example, a vehicle in a one lane may drift or change into a second lane, which may cause a vehicle in the second lane to swerve or change lanes into a third lane, etc. These behaviors may be detected and used to identify when certain behaviors (e.g., cutting off, swerving, tailgating) are and are not occurring. Other complex traffic interactions also may be detected and analyzed using V2V communications among groups of vehicle, for example, analyzing the driving behaviors of many drivers at a busy intersection, or in response to a lane starting or ending on a busy street or highway, or other complex traffic interactions.

In some examples, driving interactions may be detected, and driving behaviors may be determined, regarding how drivers respond to nearby aggressive drivers, nearby passive drivers, nearby save drivers, nearby distracted drivers, and the like. For instance, an aggressive driver or distracted driver may cause other drivers nearby to act overly aggressive in response, while a passive and courteous driver may cause other nearby drivers to drive safely in response. Such responses may be detected using V2V communications, and driving analyses/driver score calculations may be based on such responses.

Figure 5:
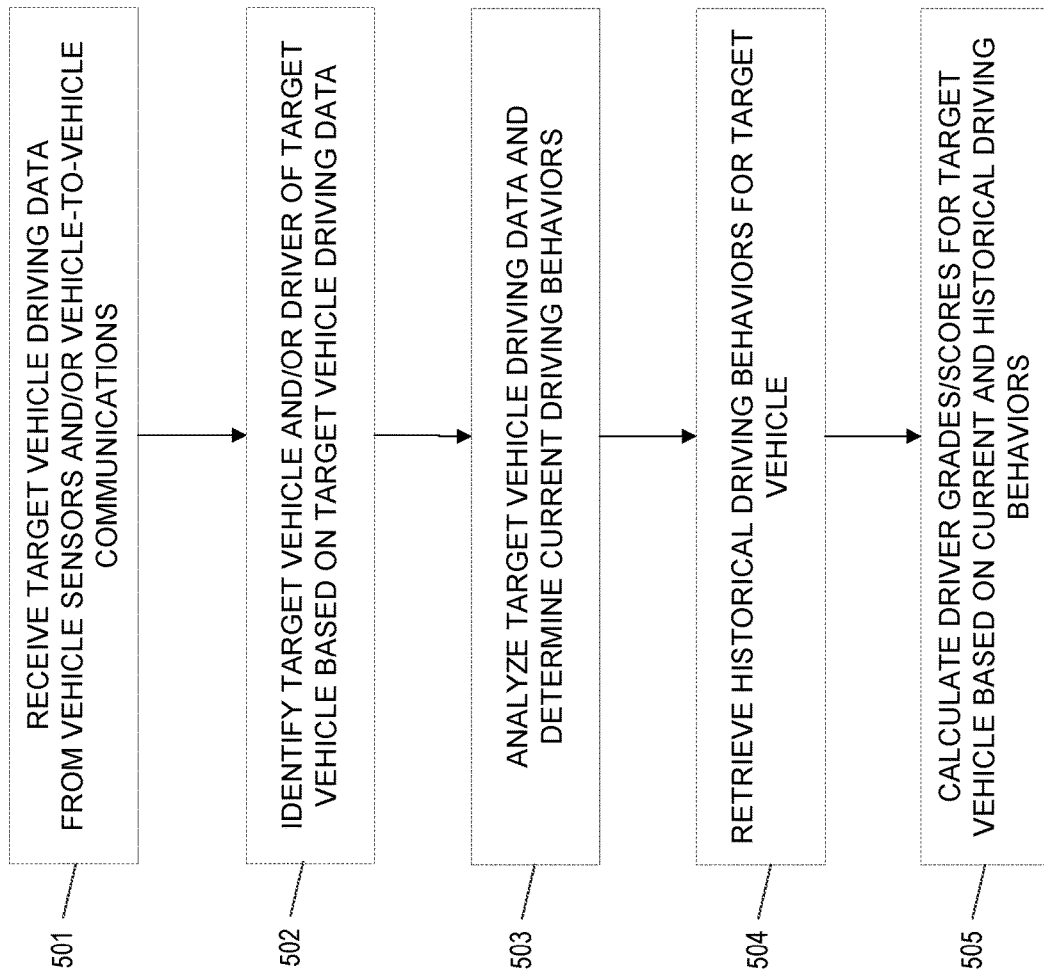
FIG. 5 is a flow diagram illustrating an example method of analyzing vehicle driving data, determining driving behaviors, and calculating driver grades/scores, according to one or more aspects of the disclosure.

FIG. 5 is a flow diagram illustrating an example method of performing driving behavior determinations and driver grade/score calculations based on analyses of vehicle driving data from vehicle-to-vehicle communications. This example method may be performed by one or more computing devices in a driving analysis system, such as vehicle-based driving analysis modules 214 and/or 224, a driving analysis module 251 of a driving analysis server 250, user mobile computing devices 215 and/or 225, and/or other computer systems.

The steps shown in FIG. 5 describe performing an automatic analysis to determine driving behaviors of vehicles using V2V communications, and then calculating or adjusting driver grades/scores based on the determined driving behaviors. As described above in reference to FIG. 2, the vehicles 210 and 220 may or may not be insurance provider customers and/or may or may not be subscribers to the insurance provider's telematics program. In some embodiments, the monitoring vehicle 210 is a customer of the insurance provider and a subscriber to the insurance provider's telematics program; while the target vehicle 220 is not a subscriber to the insurance provider's telematics program. In one or more embodiments, the target vehicle 220 is a customer of the insurance provider. In other variations, the target vehicle is not a customer of the insurance provider. Driving behaviors may include any number of identifiable "social interactions" between two or more vehicles on the road, including negative behaviors such as tailgating, cutting-off, brake-checking, preventing another vehicle from merging, and racing, or positive behaviors such as yielding, defensive avoidance, or allowing another vehicle to merge. Occurrences of negative driving behaviors may indicate a high-risk or unsafe driver, while occurrences of positive driving behaviors may indicate a low-risk or safe driver. In some cases, a monitoring vehicle 210 might not be actively involved in a driving behavior, but may be involved only as an object of another vehicle's 220 driving behavior (e.g., a vehicle 210 being tailgated by another vehicle 220, or a vehicle 210 allowed to merge by another vehicle 220), in which case the determination of the driving behavior may be neither positive nor negative with respect to vehicle 210.

In step 501, vehicle driving data may be received for a target vehicle 220, corresponding to data from the target vehicle's sensors 221. As described above in reference to FIG. 2, a driving analysis module 224 within vehicle 220 may receive and store vehicle driving data from the vehicle's internal computer systems and any combination of the vehicle's sensors 221. The data received in step 501 may include, for example, the location, speed, and direction of the vehicle 220, object proximity data from the vehicle's external cameras and proximity sensors, and data from the vehicle's various systems used to determine if the vehicle 220 is braking, accelerated, or turning, etc., and to determine the status of the vehicle's user-operated controls (e.g., head lights, turn signals, hazard lights, radio, phone, etc.), along with any other data collected by vehicle sensors 221.

Alternatively or additionally, in step 501, vehicle driving data may be received for a target vehicle 220, corresponding to data from the monitoring vehicle's 210 sensors 211. As described above in reference to FIG. 2, a driving analysis module 214 within monitoring vehicle 210 may receive and store vehicle driving data from the vehicle's internal computer systems and any combination of the vehicle's sensors 211. The data received in step 501 may include, for example, the location, speed, and direction of the target vehicle 220, object proximity data from the monitoring vehicle's external cameras and proximity sensors, and data from the monitoring vehicle's various systems used to determine if the target vehicle 220 is braking, accelerated, or turning, etc., and to determine the status of the target vehicle's user-operated controls (e.g., head lights, turn signals, hazard lights, radio, phone, etc.), along with any other data collected by the monitoring vehicle sensors 211.

Alternatively or additionally, in step 501, vehicle driving data may be received for at least one target vehicle 220, corresponding to data transmitted via V2V communications. As described above, vehicle driving data may be transmitted from the at least one target vehicle 220 to the monitoring vehicle 210 using short-range communications systems 212 and 222, user mobile devices 215 and 225, or other wireless transmission techniques. In certain examples, DSRC protocols and standards may be used, in which vehicle 220 may periodically broadcast a set of vehicle driving data to any vehicles or other receiving devices within its broadcast range. In some examples, driving data transmitted by vehicle 220 using V2V communication may include basic vehicle location, speed, and trajectory data, such as the GPS coordinates, speed and direction of travel, rate of acceleration or deceleration, and rates of turning data of the vehicle 210. However, the V2V communications may include additional data in various other examples, and may potentially include any or all of the data collected from the vehicle's sensors 221. Additionally, after two vehicles 210 and 220 have established a communication link via short-range communication systems 212 and 222, the vehicles may transmit their bearings (or relative direction) vis-à-vis the other vehicle in V2V communications. In other examples, the monitoring vehicle 210 may determine the bearing of at least one nearby target vehicle 220 by storing and analyzing multiple V2V transmissions from the vehicle 220 over a period of time.

In step 502, the vehicle driving data received in step 301 may by analyzed to identify the target vehicle 220 and/or driver of the target vehicle. As discussed above with regard to FIG. 2, telematics devices 213 and 223 also may be configured to detect or determine additional types of data relating to real-time driving and the condition of the vehicles 210 and 220. In certain embodiments, the telematics devices 213 and 223 may contain or may be integral with one or more of the vehicle sensors 211 and 221. The telematics devices 213 and 223 also may store the type of their respective vehicles 210 and 220, for example, the make, model, trim (or sub-model), year, and/or engine specifications, as well as other information such as vehicle owner or driver information, insurance information, and financing information for the vehicles 210 and 220.

In step 503, the vehicle driving data received in step 501 may be analyzed, and current driving behaviors may be determined for the target vehicle 220 based on the driving data. For example, a driving analysis module 214 in a monitoring vehicle 210 may compare the driving data (e.g., location, speed, direction) from its own vehicle sensors 211 with the corresponding driving data (e.g., location, speed, direction, etc.) from a nearby target vehicle 220 (received in step 501). Based on the relative locations, speeds, and directions of travel of vehicles 210 and 220, the driving analysis module 214 may determine a current driving behavior involving the two vehicles.

In step 504, historical driving behaviors for the target vehicle identified in step 502 may be retrieved. As discussed above in reference to FIG. 3, driving behaviors that are determined for a target vehicle may be tagged with information identifying the target vehicle. The tagged driving behaviors may then be stored in driving data and driver score database 252. Therefore, driving data and driver score database 252 may aggregate multiple sets of tagged driving behavior for a target vehicle. The source (i.e. monitoring vehicle) of each set of driving behavior may be different. At step 504, all sets of driving behavior that are tagged with information identifying the target vehicle identified in step 502 may be retrieved.

In step 505, a driver score for the target vehicle may be calculated based on the current driving behaviors determined in step 503 and the historical driving behaviors retrieved in step 504. As discussed above, driver scores and/or grades may correspond to ratings by insurance companies, financial institutions, or other organizations of the driving abilities, safe/unsafe driving habits, and other information for a driver or a related group of drivers (e.g., family, roommates, co-workers, or other group of drivers associated with the same vehicle or vehicles). Driver scores and/or grades may be used to help obtain vehicle financing and determine insurance, rates, coverage, and discounts. A driver score and/or grade for a non-customer and/or non-subscriber may be calculated, for instance, based on the data from the monitoring vehicle/driver and that grade and/or score may be used to make an offer for insurance to the non-customer and/or non-subscriber. A driver score may be based on driver grades. For instance, monitoring vehicle drivers may grade the target vehicle or target vehicle driver. These grades may be aggregated to determine the driver score of the target vehicle. If a driving analysis module 214, 224 determines a "negative" (e.g., unsafe or risky) current driving behavior for a driver of the target vehicle in step 503, then the driving analysis module 214, 224 may negatively adjust the driver's driver score and/or grade in step 505. Similarly, if the driving analysis module 214, 224 determines a "positive" or safe current driving behavior in step 503, then the driving analysis module 214, 224 may positively adjust the driver score and/or grade in step 505. The driving analysis module 214 may further adjust the driving score for the target vehicle based on historical driving behaviors retrieved for the target vehicle. For example, if the "negative" current driving behavior for the target vehicle is also included in the historical driving behavior for the target vehicle, the driving analysis module 214, 224 may negatively adjust the driver's driver score and/or grade in step 505. Similarly, if the "positive" current driving behavior for the target vehicle is also included in the historical driving behavior for the target vehicle, the driving analysis module 214, 224 may positively adjust the driver's driver score and/or grade in step 505. Therefore, not only will a target vehicle be penalized for current negative driving behavior, but if the target vehicle has a history of the same negative driving behavior, the target vehicle will be penalized again. Similarly, not only will a target vehicle be rewarded for current positive driving behavior, but if the target vehicle has a history of the same positive driving behavior, the target vehicle will be rewarded again. When calculating or adjusting a driver score and/or grade based on determined current driving behaviors and/or retrieved historical driving behaviors, behaviors of greater magnitude (e.g., severe tailgating or racing) may be weighed more heavily than less severe behaviors (e.g., minor tailgating or failure to yield to allow a lane change in traffic). Additionally, minor driving behaviors might not cause any adjustments in driver scores, and some positive and negative behaviors may cancel out so that the driver score might not be adjusted. In some cases, all occurrences of all determined positive and negative driving behaviors may be accumulated and stored over a period of time, such a week, month, year, or for an insurance term, and the accumulated set of driving behaviors may be used to calculate insurance rate adjustments or discounts, along with other factors such as accidents, vehicle maintenance, and driving record. When a specific driver of a vehicle 220 is known, the driving analysis module 214, 224 may calculate or update a driver score for that specific driver. Otherwise, the driving analysis module 214, 224 may calculate or update a driver score corresponding to the vehicle 220 and/or multiple driver scores for different drivers of the vehicle.

In one or more embodiments, a user of the driving analysis computing device (e.g., a mobile device running a V2V telematics application) may input information regarding other vehicles and drivers of those vehicles. The steps shown in FIG. 6 describe performing an analysis to determine driving behaviors of vehicles using manual user input, and then calculating or adjusting driver grades/scores based on the determined driving behaviors. As described above in reference to FIG. 2, the vehicles 210 and 220 may or may not be insurance provider customers and/or may or may not be subscribers to the insurance provider's telematics program. In some embodiments, the monitoring vehicle 210 is a customer of the insurance provider and a subscriber to the insurance provider's telematics program; while the target vehicle 220 is not a subscriber to the insurance provider's telematics program. In one or more embodiments, the target vehicle 220 is a customer of the insurance provider. In other variations, the target vehicle is not a customer of the insurance provider. Driving behaviors may include any number of identifiable "social interactions" between two or more vehicles on the road, including negative behaviors such as tailgating, cutting-off, brake-checking, preventing another vehicle from merging, and racing, or positive behaviors such as yielding, defensive avoidance, or allowing another vehicle to merge. Occurrences of negative driving behaviors may indicate a high-risk or unsafe driver, while occurrences of positive driving behaviors may indicate a low-risk or safe driver. In some cases, a monitoring vehicle 210 might not be actively involved in a driving behavior, but may be involved only as an object of another vehicle's 220 driving behavior (e.g., a vehicle 210 being tailgated by another vehicle 220, or a vehicle 210 allowed to merge by another vehicle 220), in which case the determination of the driving behavior may be neither positive nor negative with respect to vehicle 210.

In step 601 of FIG. 6, a third-party user of the driving analysis computing device witnesses a particular behavior of the target driver/vehicle (e.g., the driver of the other vehicle is driving erratically, eating, shaving, talking on a telephone, texting, using a mobile device, applying cosmetics, etc.). In step 602, the third-party user of the driving analysis computing device, without any prompt from the driving analysis computing device, may manually input, via a graphical user interface, information regarding a target vehicle 220 or the driver of the target vehicle (e.g., the identity of the other vehicle or the driver of the other vehicle, one or more behaviors of the driver of the target vehicle (e.g., the driver of the other vehicle is eating, shaving, talking on a telephone, texting, using a mobile device, applying cosmetics, etc.), etc.). The driving analysis computing device may generate and display one or more driver behavior screens which depict one or more negative driving behaviors (vehicle hard braking, speeding, acceleration, sharp turns, eating, shaving, talking on a telephone, texting, using a mobile device, applying cosmetics, etc.). The information regarding the other vehicle(s) or driver of the other vehicle(s) may be input orally or by tapping on a portion of the driver behavior screen(s) corresponding to one or more negative driving behaviors of the driver of the other vehicle.

In step 603, the third-party user of the driving analysis computing device may calculate and input a driver score/grade for the target vehicle. When a user calculates driver scores for other vehicles, these scores may be less complete and/or less accurate than when the driving analysis computing device calculates driver scores for its own vehicle, or when a driving analysis computing module at an external server calculates driver scores for its associated vehicles. For instance, a user attempting to calculate a driver score for another vehicle/driver on the same road may have only a small amount of data and a few limited interactions on which to base this driver score. Therefore, the driver scores calculated for nearby target vehicles may be classified using a relatively simple driving scale (e.g., binary, numerical, letter, etc.). If a nearby vehicle is speeding, weaving, tailgating, racing, or engaging in other negative driving behaviors, then the vehicle may be assigned a low driver score (e.g., "Bad Driver," 1 out of 5, "F," etc.). In contrast, if another nearby vehicle is obeying the speed limit and traffic laws, following at a safe distance, yielding, practicing defensive avoidance, and engaging in other positive driving behaviors, then the vehicle may be assigned a high driver score (e.g., "Good Driver," 5 out of 5, "A," etc.). In certain instances, monitoring vehicle data may be aggregated over a predetermined period of time in order to obtain more data and/or more accurate data. Monitoring vehicle data for a particular target vehicle from multiple monitoring vehicles (either at the same time or over a predetermined time period) may also be aggregated in order to obtain more data and/or more accurate data. For instance, monitoring data from a plurality of monitoring vehicles nearby a target vehicle may be aggregated to determine a driver grade and/or score for a particular target vehicle. In other instances, each monitoring vehicle may grade a particular target vehicle and those grades could be used (either at the same time or over a predetermined time period) to determine a driver score for the target vehicle.

In some examples, in step 604, additional information may be used to calculate/adjust driver scores for target vehicles in order to increase the accuracy of the driver scores. For example, the driving analysis computing device may receive additional vehicle identifying information (e.g., region 901 of FIGS. 8 and 9) for other nearby vehicles via additional third-party user input or over the V2V communication link (e.g., the other vehicle's make, model, year, VIN, insurance information, driver information, license plate, and/or owner information). The driving analysis computing device may use this additional information to perform a more accurate driver score calculation, or may transmit this information to the driving analysis server, which may perform the driver score calculations for the other vehicles after accessing driving records, insurance records, and any other available information regarding the other vehicles or drivers.

The steps shown in FIG. 7 describe performing an analysis to determine driving behaviors of vehicles using manual user input and V2V communications, and then calculating or adjusting driver grades/scores based on the determined driving behaviors. In step 701, using V2V communications, nearby target vehicles transmit vehicle driving data (e.g., telematics data, the identity of the other vehicle or the driver of the other vehicle, etc.) to the driving analysis computing device. For instance, while a vehicle including the driving analysis computing device is being driven, its short-range communication system may be used to initiate communication links and receive vehicle driving data via V2V communications from other vehicles near the vehicle. As discussed above, DSRC protocols and standards may be used for V2V communications in some systems, while other various V2V communication hardware, techniques, and protocols may be used in other systems.

Upon receiving the vehicle driving data from at least one target vehicle over V2V communications, the driving analysis computing device, in step 702, may prompt the user to manually input, via a graphical user interface, information regarding the target vehicle(s) or driver of the target vehicle(s) (e.g., the identity of the target vehicle or the driver of the target vehicle, one or more behaviors of the driver of the target vehicle (e.g., the driver of the target vehicle is eating, shaving, talking on a telephone, texting, using a mobile device, applying cosmetics, etc.), etc.). In certain instances, such prompt may include the driving analysis computing device displaying the data transmitted by the target vehicle (or a summary thereof) to the user via the graphical user interface. For example, the driving analysis computing device may display a screen indicating that the target vehicle is involved in a particular behavior (e.g., region 902 of FIGS. 8 and 9) (e.g., speeding, hard breaking, swerving, etc.). One example of such screen is illustrated in FIG. 8. In certain embodiments, such prompt may include the driving analysis computing device generating and displaying, via a graphical user interface, one or more driver behavior screens which depict one or more negative driving behaviors (vehicle hard braking, speeding, acceleration, sharp turns, eating, shaving, talking on a telephone, texting, using a mobile device, applying cosmetics, etc.). One example of such screen is illustrated in FIG. 9.

In step 703, the third-party user inputs information regarding the target vehicle or driver of the target vehicle. The information may be input orally or by tapping on the prompt screen. Where the prompt of step 702 includes the driving analysis computing device displaying the data transmitted by the target vehicle (or a summary thereof) to the user via the graphical user interface (e.g., using a statement or graphic indicative of a particular behavior), the user input may include a confirmation or denial (e.g., tapping YES 903 or NO 904 on the screen of FIG. 8). Where the prompt of step 702 includes the driving analysis computing device displaying one or more driver behavior screens which depict one or more negative driving behaviors, the user input may include tapping on a portion of the driver behavior screen(s) corresponding to one or more negative driving behaviors of the driver of the other vehicle.

In step 704, the third-party user of the driving analysis computing device may calculate and input a driver score/grade for the target vehicle. As discussed above, when a user calculates driver scores for other vehicles, these scores may be less complete and/or less accurate than when the driving analysis computing device calculates driver scores for its own vehicle, or when a driving analysis computing module at an external server calculates driver scores for its associated vehicles. For instance, a user attempting to calculate a driver score for another vehicle/driver on the same road may have only a small amount of data and a few limited interactions on which to base this driver score. Therefore, the driver scores calculated for nearby target vehicles may be classified using a relatively simple driving scale (e.g., binary, numerical, letter, etc.). If a nearby vehicle is speeding, weaving, tailgating, racing, or engaging in other negative driving behaviors, then the vehicle may be assigned a low driver score (e.g., "Bad Driver," 1 out of 5, "F," etc.). In contrast, if another nearby vehicle is obeying the speed limit and traffic laws, following at a safe distance, yielding, practicing defensive avoidance, and engaging in other positive driving behaviors, then the vehicle may be assigned a high driver score (e.g., "Good Driver," 5 out of 5, "A," etc.).

In some examples, additional information may be used to calculate/adjust driver scores for target vehicles in order to increase the accuracy of the driver scores. For example, the driving analysis computing device may receive additional vehicle identifying information 901 for other nearby vehicles via additional third-party user input or over the V2V communication link (e.g., the other vehicle's make, model, year, VIN, insurance information, driver information, license plate, and/or owner information). The driving analysis computing device may use this additional information to perform a more accurate driver score calculation, or may transmit this information to the driving analysis server, which may perform the driver score calculations for the other vehicles after accessing driving records, insurance records, and any other available information regarding the other vehicles or drivers.

The following are some example implementations of the systems and arrangements described herein. They are intended to be just some example implementations and are not intended to limit the systems described herein to only the examples provided.

In one example, Driver A is a customer of an insurance provider and a subscriber to the insurance provider's telematics program. Driver A is driving near Driver B, who is not a customer of the insurance provider and not a subscriber to the insurance provider's telematics program. Noting the posted speed limit and noticing that Driver B is driving much faster than such speed limit, Driver A taps on the screen of her driving analysis computing device 800 (including some or all of the structural components described above for computing device 101) as illustrated in FIG. 8 (e.g., a mobile device running the insurance provider's telematics program) and enters the license plate number of the vehicle of Driver B in the identification information portion of the screen 801. Upon doing such, her driving analysis computing device 800 generates a negative driving behavior icon 802 (e.g., speeding) and prompts Driver A to answer "YES" 803 or "NO" 804 to whether or not Driver B is speeding. Upon taping "YES" 803, such information is sent to the insurance provider and may be used to grade and/or score Driver B.

In another example, Driver A is a customer of an insurance provider and a subscriber to the insurance provider's telematics program. Driver A is driving near Driver B, who is not a customer of the insurance provider and not a subscriber to the insurance provider's telematics program. Noting that Driver B is tailgating the vehicle in front of him while texting on his mobile device, Driver A taps on the screen of her driving analysis computing device 905 (including some or all of the structural components described above for computing device 101) as illustrated in FIG. 9 (e.g., a mobile device running the insurance provider's telematics program) and enters the license plate number of the vehicle of Driver B in the identification information portion of the screen 901. Upon doing such, her driving analysis computing device 905 generates a few negative driving behavior icons 902 (e.g., speeding, tailgating, and texting). Driver A then taps on the negative driving behavior icons 902 corresponding to the behavior that she witnessed (e.g., tailgating and texting). Once Driver A finishes tapping the appropriate negative driving behavior icons 902, such information is sent to the insurance provider and may be used to grade and/or score Driver B.

While the aspects described herein have been discussed with respect to specific examples including various modes of carrying out aspects of the disclosure, those skilled in the art will appreciate that there are numerous variations and permutations of the above described systems and techniques that fall within the spirit and scope of the disclosure.

The invention claimed is:

1. A driving analysis computing device, comprising:
a processor; and
memory storing computer-executable instructions, which when executed by the processor, cause the driving analysis computing device to:
receive monitoring vehicle driving data from vehicle operation sensors within a monitoring vehicle;
receive target vehicle driving data associated with a target vehicle from the target vehicle via one or more vehicle-to-vehicle communications between the monitoring vehicle and the target vehicle;
compare the monitoring vehicle driving data with the target vehicle driving data;
determine, based on the comparing, a driving behavior associated with the target vehicle;
determine, when the driving behavior occurs for a length of time exceeding a minimum time threshold, a severity of the driving behavior, wherein the length of time corresponds to a particular severity of the driving behavior;
calculate, based on the severity of the driving behavior, a score for the target vehicle or a driver of the target vehicle; and
output the driving behavior to a display to be identified as severely negative when the score is above a severe threshold.

2. The driving analysis computing device of claim 1, wherein calculating the score comprises assigning a weight to the driving behavior based on the severity of the driving behavior.

3. The driving analysis computing device of claim 1, the memory storing additional computer-executable instructions, which when executed by the processor, cause the driving analysis computing device to:
upload the driving behavior to a server.

4. The driving analysis computing device of claim 3, wherein the target vehicle driving data comprises one or more of a speed of the target vehicle, a position of the target vehicle, and a direction of travel of the target vehicle.

5. The driving analysis computing device of claim 1, wherein the target vehicle driving data comprises a driver score associated with the target vehicle or a driver of the target vehicle.

6. The driving analysis computing device of claim 1, wherein determining the driving behavior comprises:
determining a first relative position of the target vehicle with respect to the monitoring vehicle at a first time; and
determining a second relative position of the target vehicle with respect to the monitoring vehicle at a second time after the first time.

7. The driving analysis computing device of claim 6, wherein determining the driving behavior comprises:
determining that the target vehicle tailgated the monitoring vehicle, based on the first and second relative positions and the first and second times, and based on the target vehicle being within a minimum following distance from the monitoring vehicle for longer than the minimum time threshold.

8. The driving analysis computing device of claim 6, wherein determining the driving behavior comprises:
determining that the target vehicle cut off the monitoring vehicle, based on the first and second relative positions and the first and second times, and based on the monitoring vehicle being within a minimum following distance from the target vehicle for longer than the minimum time threshold after the target vehicle changes lane.

9. A computer-implemented method, comprising:
receive, by a driving analysis computing device, monitoring vehicle driving data from vehicle operation sensors within a monitoring vehicle;
receiving, by the driving analysis computing device and via one or more vehicle-to-vehicle communications between the monitoring vehicle and a target vehicle, target vehicle driving data corresponding to target vehicle operation data of the target vehicle;
determining, by the driving analysis computing device and based on a comparison of the monitoring vehicle driving data with the target vehicle driving data, a driving behavior associated with the target vehicle;
determining, when the driving behavior occurs for a length of time exceeding a minimum time threshold a severity of the driving behavior, wherein the length of time corresponds to a particular severity of the driving behavior;
calculating based on the severity of the driving behavior, a score for the target vehicle or a driver of the target vehicle; and outputting, by the driving analysis computing device, the driving behavior to a display to be identified as severely negative when the score is above a severe threshold.

10. The computer-implemented method of claim 9, wherein calculating the score comprises assigning a weight to the driving behavior based on the severity of the driving behavior.

11. The computer-implemented method of claim 10, further comprising:
retrieving, by the driving analysis computing device, historical driving behavior associated with the target vehicle,
wherein the score for the target vehicle is further calculated based on the historical driving behavior associated with the target vehicle.

12. The computer-implemented method of claim 9, wherein the target vehicle driving data received via vehicle-to-vehicle communication comprises at least one selected from the group consisting of a speed of the target vehicle, a position of the target vehicle, and a direction of travel of the target vehicle.

13. The computer-implemented method of claim 9, wherein the target vehicle driving data received via vehicle-to-vehicle communication comprises a driver score associated with the target vehicle or a driver of the target vehicle.

14. The computer-implemented method of claim 9, wherein determining the driving behavior comprises:
determining a first relative position of the target vehicle with respect to the monitoring vehicle at a first time; and
determining a second relative position of the target vehicle with respect to the monitoring vehicle at a second time after the first time.

15. The computer-implemented method of claim 14, wherein determining the driving behavior comprises:
determining that the target vehicle tailgated or cut-off the monitoring vehicle, based on the first and second relative positions and the first and second times, and based on either:
that the target vehicle is within a minimum following distance from the monitoring vehicle for longer than the minimum time threshold, or
that the monitoring vehicle is within a minimum following distance from the target vehicle for longer than the minimum time threshold after the target vehicle changes lane.

16. The computer-implemented method of claim 14, wherein determining the driving behavior comprises:
determining that the target vehicle followed the monitoring vehicle at a safe following distance, yielded to the monitoring vehicle, or defensively avoided the monitoring vehicle, based on the first and second relative positions and the first and second times.

17. A driving analysis system associated with a monitoring vehicle, the driving analysis system comprising:
one or more vehicle operation sensors within the monitoring vehicle;
a first communication system configured to receive target vehicle driving data from a target vehicle; and
a driving analysis computing device configured to:
receive monitoring vehicle driving data from vehicle operation sensors within a monitoring vehicle;
receive target vehicle driving data associated with a target vehicle, wherein the target vehicle driving data is received via one or more vehicle-to-vehicle communications between the monitoring vehicle and the target vehicle;
determine, based on a comparison of the monitoring vehicle driving data with the target vehicle driving data, a driving behavior associated with the target vehicle;
determine, when the driving behavior occurs for a length of time exceeding a minimum time threshold, a severity of the driving behavior, wherein the length of time corresponds to a particular severity of the driving behavior;
calculate, based on the severity of the driving behavior, a score for the target vehicle or a driver of the target vehicle; and
output the driving behavior to a display to be identified as severely negative when the score is above a severe threshold.

18. The driving analysis system of claim 17, wherein the target vehicle driving data comprises one or more of a speed of the target vehicle, a position of the target vehicle, and a direction of travel of the target vehicle.

19. The driving analysis system of claim 17, the memory storing computer-executable instructions, which when executed by the one or more processors, cause the driving analysis computing device to:
display, via a graphical user interface, the target vehicle driving data.

20. The driving analysis system of claim 17, wherein a user input received from the driver of the monitoring vehicle comprises an identity of the target vehicle or the driver of the target vehicle.

* * * * *